(12) United States Patent
Nam et al.

(10) Patent No.: US 12,724,516 B2
(45) Date of Patent: Sep. 1, 2026

(54) INPUT SENSING PART AND DISPLAY DEVICE INCLUDING THE SAME

(71) Applicant: Samsung Display Co., Ltd., Yongin-Si (KR)

(72) Inventors: Ha Yeong Nam, Yongin-si (KR); Ye Ri Jeong, Yongin-si (KR); Jeong Yun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/174,325

(22) Filed: Apr. 9, 2025

(65) Prior Publication Data

US 2026/0003463 A1 Jan. 1, 2026

(30) Foreign Application Priority Data

Jun. 27, 2024 (KR) ........................ 10-2024-0084627

(51) Int. Cl.
*G06F 3/044* (2006.01)
*G06F 3/041* (2006.01)

(52) U.S. Cl.
CPC ........ *G06F 3/0442* (2019.05); *G06F 3/04164* (2019.05); *G06F 3/0446* (2019.05)

(58) Field of Classification Search
CPC ... G06F 3/04164; G06F 3/0442; G06F 3/0446
See application file for complete search history.

(56) References Cited

U.S. PATENT DOCUMENTS

2021/0342053 A1* 11/2021 Cho .................... G06F 3/04164
2022/0147212 A1* 5/2022 Kim .................... G06F 3/04162
2022/0262866 A1* 8/2022 Kim ...................... G06F 3/0412
2024/0231532 A1 7/2024 Kim et al.
2024/0393897 A1* 11/2024 Zeng ...................... G06F 3/041

FOREIGN PATENT DOCUMENTS

KR 102453868 B1 10/2022

* cited by examiner

*Primary Examiner* — Peter D Mcloone
(74) *Attorney, Agent, or Firm* — Innovation Counsel LLP

(57) ABSTRACT

An input sensing part includes a base layer including an active area and a peripheral area disposed adjacent to the active area, first sensing electrodes arranged in the active area and extending in a first direction, second sensing electrodes arranged in the active area and extending in a second direction intersecting with the first direction, first pen sensing electrodes arranged in the active area, extending in the first direction, and insulated from the first sensing electrodes, second pen sensing electrodes arranged in the active area, extending in the second direction, and insulated from the second sensing electrodes, a pen sensing line connected to the first pen sensing electrodes, and an additional electrode insulated from the pen sensing line and overlapping at least a portion of the pen sensing line in a plan view.

18 Claims, 17 Drawing Sheets

INPUT SENSING PART AND DISPLAY DEVICE INCLUDING THE SAME

CROSS-REFERENCE TO RELATED APPLICATION

This application claims priority to and the benefit of Korean Patent Application No. 10-2024-0084627 filed in the Korean Intellectual Property Office on Jun. 27, 2024, the entire contents of which are incorporated herein by reference.

BACKGROUND

1. Field

The present disclosure relates to an input sensing part and a display device including the same.

2. Description of the Related Art

Electronic devices such as smartphones, digital cameras, laptop computers, navigation devices, and smart televisions which provide images to users include display devices for displaying images. Display devices generate images and provide the images to users through display screens.

Display devices include a display panel that displays an image, a touch panel that is arranged on the display panel and senses a touch of a user, and a digitizer that is arranged under the display panel and senses a touch of a pen. The digitizer may be implemented in an electromagnetic scheme (or an electromagnetic resonance scheme).

The digitizer includes a plurality of coils. When the user moves the pen on the display device, the pen is driven by an AC signal to cause an oscillating magnetic field, which induces a signal in the coils. The position of the pen is detected by the signal induced in the coils. The digitizer determines the position of the pen by sensing the electromagnetic change caused by the approach of the pen.

Separate use of the input devices, such as the touch panel and the digitizer, may increase a thickness of a display device. Therefore, there is a need to develop a technology for reducing a thickness of a display device.

SUMMARY

An object of the present disclosure is to provide an input sensing part with improved sensing reliability.

Another object of the present disclosure is to provide a display device including an input sensing part.

To achieve one object of the present disclosure, an input sensing part in accordance with embodiments of the present disclosure includes a base layer including an active area and a peripheral area disposed adjacent to the active area, first sensing electrodes arranged in the active area and extending in a first direction, second sensing electrodes arranged in the active area and extending in a second direction intersecting with the first direction, first pen sensing electrodes arranged in the active area, extending in the first direction, and insulated from the first sensing electrodes, second pen sensing electrodes arranged in the active area, extending in the second direction, and insulated from the second sensing electrodes, a pen sensing line connected to the first pen sensing electrodes, and an additional electrode insulated from the pen sensing line and overlapping at least a portion of the pen sensing line in a plan view.

In an embodiment, a reference voltage may be applied to the additional electrode.

In an embodiment, the input sensing part may further include a guard line arranged in the peripheral area and at least partially surrounding the active area, and the additional electrode may be connected to the guard line.

In an embodiment, a reference voltage may be applied to the guard line.

In an embodiment, the input sensing part may further include a first conductive pattern formed on the base layer, and a second conductive pattern formed on the first conductive pattern, wherein the first conductive pattern may form the pen sensing line, and the second conductive pattern may form the additional electrode.

In an embodiment, the input sensing part may further include a first insulating layer arranged between the at least a portion of the pen sensing line and the additional electrode.

In an embodiment, the first insulating layer may be an inorganic insulating layer.

In an embodiment, the first conductive pattern may form at least one of the first pen sensing electrodes and the second pen sensing electrodes.

In an embodiment, the second conductive pattern may form at least one of the first sensing electrodes and the second sensing electrodes.

In an embodiment, the input sensing part may further include an insulating layer arranged between the first pen sensing electrodes and the second pen sensing electrodes and between the first sensing electrodes and the second sensing electrodes, wherein the insulating layer may be an organic insulating layer.

In an embodiment, the input sensing part may further include a first insulating layer arranged between the at least a portion of the pen sensing line and the additional electrode, and a second insulating layer arranged between the first pen sensing electrodes and the second pen sensing electrodes and between the first sensing electrodes and the second sensing electrodes, wherein a thickness of the first sensing layer including the at least a portion of the pen sensing line, the additional electrode, and the first insulating layer may be less than a thickness of the second sensing layer including the first pen sensing electrodes and the second pen sensing electrodes, the first sensing electrodes and the second sensing electrodes, and the second insulating layer.

In an embodiment, the input sensing part may further include a pad connected to at least one of the first pen sensing electrodes, wherein the pad may be disposed on one side of the active area to be spaced apart from the active area and the pen sensing line is disposed on another side which opposes the one side of the active area and connected to the first pen sensing electrodes.

In an embodiment, the input sensing part may further include a peripheral pen sensing electrode arranged in the peripheral area and connected to the pen sensing line.

In an embodiment, the input sensing part may further include a first conductive pattern formed on the base layer, and a second conductive pattern formed on the first conductive pattern, wherein the first conductive pattern and the second conductive pattern may form the peripheral pen sensing electrode.

In an embodiment, the first conductive pattern forming the peripheral pen sensing electrode may be electrically connected to the second conductive pattern forming the peripheral pen sensing electrode.

To achieve one object of the present disclosure, a display device in accordance with embodiments of the present disclosure includes a display panel, and an input sensing part arranged on the display panel, wherein the input sensing part includes a base layer including an active area and a peripheral area disposed adjacent to the active area, first sensing electrodes arranged in the active area and extending in a first direction, second sensing electrodes arranged in the active area and extending in a second direction intersecting with the first direction, first pen sensing electrodes arranged in the active area, extending in the first direction, and insulated from the first sensing electrodes, second pen sensing electrodes arranged in the active area, extending in the second direction, and insulated from the second sensing electrodes, a pen sensing line connected to the first pen sensing electrodes, and an additional electrode insulated from the pen sensing line and overlapping at least a portion of the pen sensing line in a plan view.

In an embodiment, the display device may further include a touch circuit configured to drive the input sensing part and electrically connected to a pad of the input sensing part, wherein the pad may be disposed on one side of the active area to be spaced apart from the active area and the pen sensing line is disposed on another side which opposes the one side of the active area and connected to the first pen sensing electrodes.

In an embodiment, a reference voltage may be applied to the additional electrode.

In an embodiment, the input sensing part may further include a guard line arranged in the peripheral area and at least partially surrounding the active area, and the additional electrode may be connected to the guard line.

In an embodiment, the input sensing part may further include a first conductive pattern formed on the base layer, a second conductive pattern formed on the first conductive pattern, and a first insulating layer arranged between the at least a portion of the pen sensing line and the additional electrode, wherein the pen sensing line may be formed of a same layer as the first conductive pattern, the additional electrode is formed of a same layer as the second conductive pattern, and the first insulating layer is an inorganic insulating layer.

DETAILED DESCRIPTION OF THE EMBODIMENTS

Figure 1:
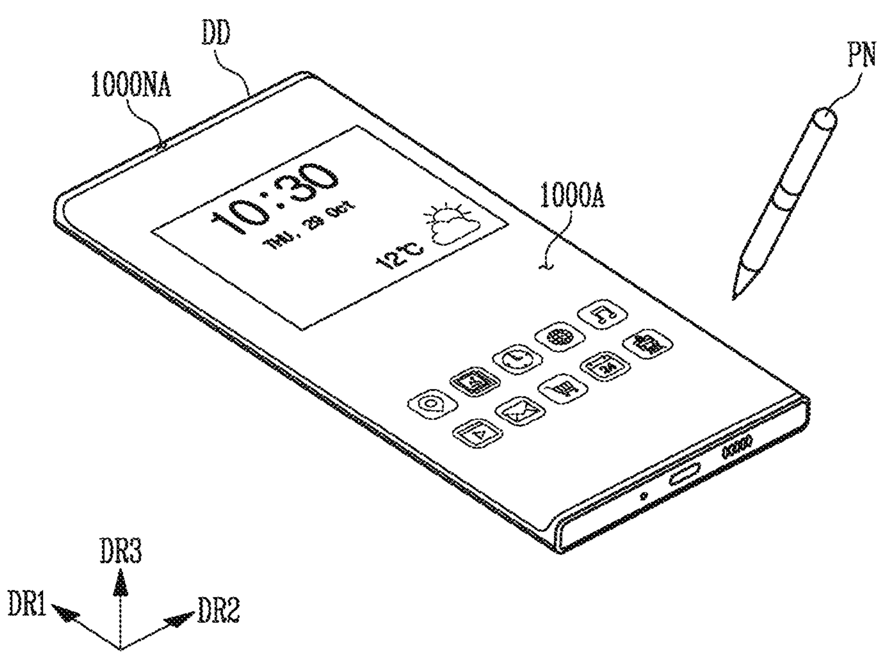
FIG. 1 is a perspective view of a display device in accordance with an embodiment of the present disclosure.

Hereinafter, embodiments in accordance with the present disclosure will be described in detail with reference to the accompanying drawings. It should be noted that only the parts necessary to understand operations in accordance with the present disclosure will be described below, and the description of the other parts will be omitted in order not to obscure the gist of the present disclosure. In addition, the present disclosure is not limited to the embodiments described herein and may be embodied in other forms. Hereinafter, embodiments of the present disclosure will be described in detail so that those of ordinary skill in the art can easily carry out the present disclosure. It will be understood that when a portion is referred to as being "connected to" another portion, it may be "directly connected to" the other portion or "indirectly connected to" the other portion with intervening portions therebetween. The terminology used herein is intended to describe specific embodiments and is not intended to limit the present disclosure. It will be understood that the terms "comprise," "include," or "have" as used herein specify the presence of stated elements, but do not preclude the presence or addition of one or more other elements. The expression "at least one of X, Y, and Z" and "at least one selected from the group consisting of X, Y, and Z" may be interpreted as one X, one Y, one Z, or any combination of two or more of X, Y, and Z (e.g., XYZ, XYY, YZ, ZZ, etc.). The term "and/or" as used herein includes any combination of one or more of the elements.

It will be understood that although the terms such as "first," "second," etc. may be used to describe various elements, these elements should not be limited by these terms. These terms are only used to distinguish one element from another. Accordingly, a first element may be referred to as a second element without departing from the scope of the present disclosure.

Spatially relative terms such as "below," "above," etc. may be used for descriptive purposes, thereby describing the relationship between one element or feature and another element(s) or feature(s) as illustrated in the drawings. Spatially relative terms are intended to include different directions in use, operation, and/or manufacture, in addition to the directions depicted in the drawings. For example, when the device illustrated in the figures is turned over, elements depicted as being located "below" other elements or features are located "above" the other elements or features. Accordingly, in an embodiment, the term "below" may include both up and down directions. In addition, the device may be oriented in other directions (e.g., rotated by 90 degrees or in other orientations), and thus, the spatially relative terms as used herein should be interpreted accordingly.

Various embodiments are described with reference to drawings that schematically illustrate ideal embodiments. Accordingly, it will be expected that the shapes may vary depending on, for example, tolerances and/or manufacturing techniques. Therefore, the embodiments disclosed herein should not be construed as limited to the illustrated specific shapes, but should be construed to include changes in shapes that occur, for example, as a result of manufacturing. As such, the shapes illustrated in the drawings may not depict the actual shapes of the areas of the device, and the present embodiments are not limited thereto.

Hereinafter, the present disclosure will be described in more detail with reference to the accompanying drawings.

FIG. 1 is a perspective view of a display device in accordance with an embodiment of the present disclosure.

Referring to FIG. 1, a display device DD may sense a first input from an input device PN. The display device DD may be a device that is activated by an electrical signal. For example, the display device DD may be a mobile phone, a tablet, an automobile navigation system, a game console, or a wearable device, but the present disclosure is not limited thereto. In FIG. 1, a case where the display device DD is a mobile phone is illustrated as an example.

The display device DD may include an active area 1000A and a peripheral area 1000NA. The display device DD may display an image through the active area 1000A. The active area 1000A may include a surface defined by a first direction DR1 and a second direction DR2. The peripheral area 1000NA may surround the periphery of the active area 1000A.

The display device DD may sense inputs applied from the outside of the display device DD. The external inputs may include various forms of external inputs such as parts of the user's body, light, heat, or pressure. The external inputs may be referred to as a second input.

The display device DD illustrated in FIG. 1 may sense an input of the user's touch and an input of the input device PN. The input device PN may refer to a device other than the user's body. The input of the input device PN may be referred to as a first input. Examples of the input device PN may include an active electrostatic (AES) pen, an electro-magnetic resonance (EMR) pen, a stylus pen, a touch pen, or an electronic pen. Hereinafter, a case where the input device PN is an electro-magnetic resonance pen is described as an example.

Figure 2:
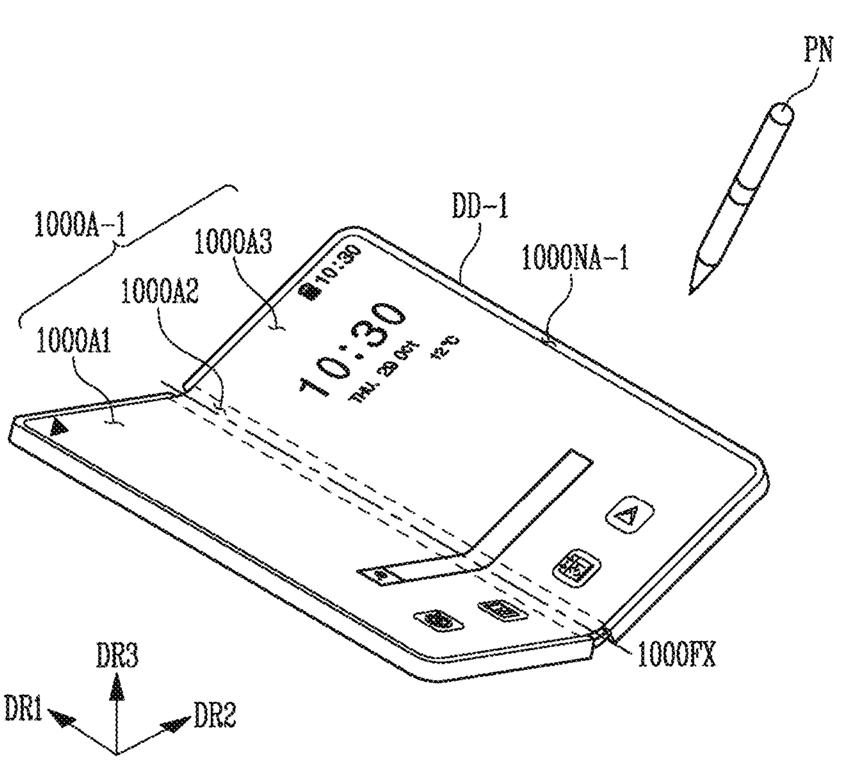
FIG. 2 is a perspective view of a display device in accordance with an embodiment of the present disclosure.

FIG. 2 is a perspective view of a display device in accordance with an embodiment of the present disclosure. In describing FIG. 2, the same reference numerals are used for elements described with reference to FIG. 1, and a description thereof is omitted.

FIG. 2 illustrates a state in which a display device DD-1 is folded at a certain angle. Referring to FIG. 2, when the display device DD-1 is in an unfolded state, an active area 1000A-1 may include a plane defined by a first direction DR1 and a second direction DR2.

The active area 1000A-1 may include a first area 1000A1, a second area 1000A2, and a third area 1000A3. The first area 1000A1, the second area 1000A2, and the third area 1000A3 may be sequentially defined in the second direction DR2. The second area 1000A2 may be bent about a folding axis 1000FX extending in the first direction DR1. Accordingly, the first area 1000A1 and the third area 1000A3 may be referred to as non-folding areas, and the second area 1000A2 may be referred to as a folding area.

When the display device DD-1 is folded, the first area 1000A1 and the third area 1000A3 may face each other. Therefore, in a fully folded state, the active area 1000A-1 may not be exposed to the outside, which may be referred to as in-folding. However, this is only an example and the operation of the display device DD-1 in accordance with an embodiment of the present disclosure is not limited thereto.

For example, when the display device DD-1 in accordance with an embodiment of the present disclosure is folded, the first area 1000A1 and the third area 1000A3 may face opposite directions. Therefore, in a folded state, the active area 1000A-1 may be exposed to the outside, which may be referred to as out-folding.

The display device DD-1 may be capable of only one of in-folding or out-folding. Alternatively, the display device DD-1 may be capable of both in-folding and out-folding. In this case, the same area of the display device DD-1, for example, the second area 1000A2, may be in-folded and out-folded.

In FIG. 2, one folding area and two non-folding areas are illustrated as an example, but the number of folding areas and non-folding areas is not limited thereto. For example, the display device DD-1 may include more than two unfolding areas and a plurality of folding areas arranged between adjacent unfolding areas.

In FIG. 2, a case where the folding axis 1000FX extends in the first direction DR1 is illustrated as an example, but the present disclosure is not limited thereto. For example, the folding axis 1000FX may extend in a direction parallel to the second direction DR2. In this case, the first area 1000A1, the second area 1000A2, and the third area 1000A3 may be sequentially arranged in the first direction DR1.

Figure 3:
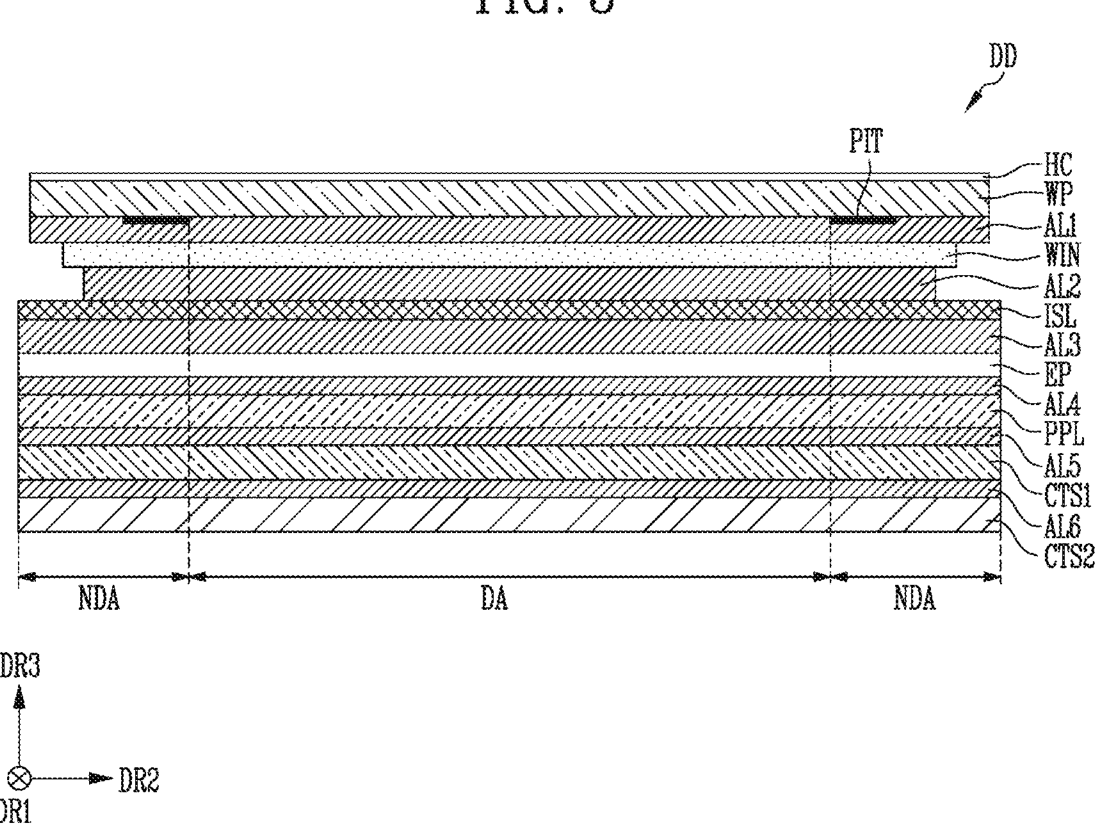
FIG. 3 is a cross-sectional view of a display device in accordance with an embodiment of the present disclosure.

FIG. 3 is a cross-sectional view of a display device in accordance with an embodiment of the present disclosure.

Referring to FIG. 3, a display device DD may include an electronic panel EP, an impact absorbing layer ISL, a panel protection layer PPL, a first conductive sheet CTS1, a second conductive sheet CTS2, a window WIN, a window protection layer WP, a hard coating layer HC, and first to sixth adhesive layers AL1 to AL6.

The electronic panel EP may display an image, sense the first and second inputs described above, and reduce a reflectance of external light. The electronic panel EP may include a display panel, an input sensing part, and a reflection prevention layer. The configuration of the electronic panel EP is described below with reference to FIG. 4.

The impact absorbing layer ISL may be arranged on the electronic panel EP. The impact absorbing layer ISL may protect the electronic panel EP by absorbing external impact applied from above the display device DD toward the electronic panel EP. The impact absorbing layer ISL may be a stretched film.

The impact absorbing layer ISL may comprise a flexible plastic material. The flexible plastic material may include a synthetic resin film. For example, the impact absorbing layer ISL may include a flexible plastic material such as polyimide (PI) or polyethylene terephthalate (PET).

The panel protection layer PPL may be arranged under the electronic panel EP. The panel protection layer PPL may protect the lower portion of the electronic panel EP. The panel protection layer PPL may include a flexible plastic material. For example, the panel protection layer PPL may include PET.

The first conductive sheet CTS1 may be arranged under the panel protection layer PPL. The second conductive sheet CTS2 may be arranged under the first conductive sheet CTS1. Each of the first conductive sheet CTS1 and the second conductive sheet CTS2 may include metal.

The first conductive sheet CTS1 may include a ferromagnetic material. For example, the first conductive sheet CTS1 may be a ferrite sheet including ferrite. The second conductive sheet CTS2 may include a diamagnetic material. For example, the second conductive sheet CTS2 may be a copper sheet including copper. The first and second conductive sheets CTS1 and CTS2 may shield an external magnetic field so that the external magnetic field is not applied from below the display device DD toward the electronic panel EP.

The window WIN may be arranged on the impact absorbing layer ISL. The window WIN may protect the electronic panel EP from external scratches. The window WIN may have optically transparent properties. The window WIN may include glass. However, the present disclosure is not limited thereto, and the window WIN may include a synthetic resin film.

The window WIN may have a multilayer structure or a single-layer structure. For example, the window WIN may include a plurality of synthetic resin films bonded with an adhesive, or may include a glass substrate and a synthetic resin film bonded with an adhesive.

The window protection layer WP may be arranged on the window WIN. The window protection layer WP may include a flexible plastic material such as PI or PET. The hard coating layer HC may be arranged on the upper surface of the window protection layer WP.

A printing layer PIT may be arranged on the lower surface of the window protection layer WP. The printing layer PIT may be black, but the color of the printing layer PIT is not limited thereto. The printing layer PIT may be disposed adjacent to the edge of the window protection layer WP. The printing layer PIT may overlap a non-display area NDA.

The first adhesive layer AL1 may be arranged between the window protection layer WP and the window WIN. The window protection layer WP and the window WIN may be bonded to each other by the first adhesive layer AL1. The first adhesive layer AL1 may cover the printing layer PIT.

The second adhesive layer AL2 may be arranged between the window WIN and the impact absorbing layer ISL. The window WIN and the impact absorbing layer ISL may be bonded to each other by the second adhesive layer AL2.

The third adhesive layer AL3 may be arranged between the impact absorbing layer ISL and the electronic panel EP. The shock absorbing layer ISL and the electronic panel EP may be bonded to each other by the third adhesive layer AL3.

The fourth adhesive layer AL4 may be arranged between the electronic panel EP and the panel protection layer PPL. The electronic panel EP and the panel protection layer PPL may be bonded to each other by the fourth adhesive layer AL4.

The fifth adhesion layer AL5 may be arranged between the panel protection layer PPL and the first conductive sheet CTS1. The panel protection layer PPL and the first conductive sheet CTS1 may be bonded to each other by the fifth adhesive layer AL5.

The sixth adhesive layer AL6 may be arranged between the first conductive sheet CTS1 and the second conductive sheet CTS2. The first conductive sheet CTS1 and the second conductive sheet CTS2 may be bonded to each other by the sixth adhesive layer AL6.

The first to sixth adhesive layers AL1 to AL6 may include a pressure sensitive adhesive (PSA) or an optically clear adhesive (OCA), but the type of adhesive is not limited thereto.

Figure 4:
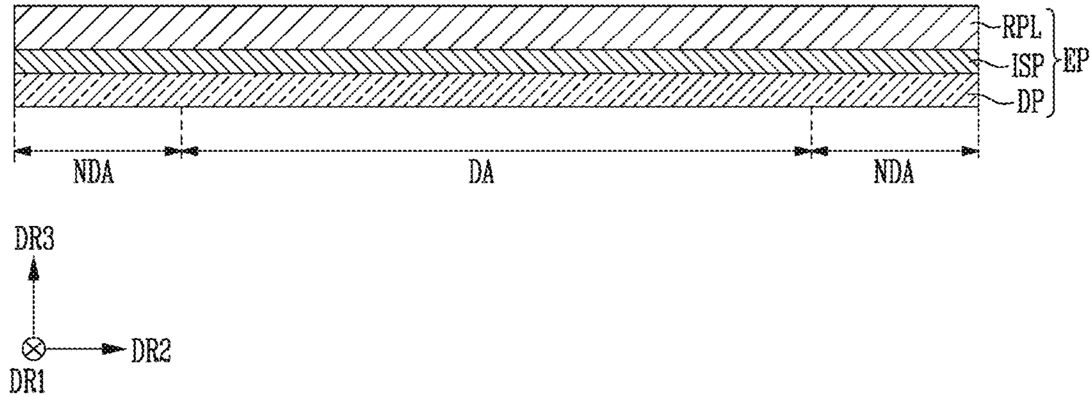
FIG. 4 is a cross-sectional view of an electronic panel in accordance with an embodiment of the present disclosure.

FIG. 4 is a cross-sectional view of an electronic panel in accordance with an embodiment of the present disclosure.

Referring to FIG. 4, an electronic panel EP may include a display panel DP, an input sensing part ISP disposed on the display panel DP, and a reflection prevention layer RPL disposed on the input sensing part ISP. The display panel DP may be a flexible display panel. For example, the display panel DP may include a flexible substrate and a plurality of elements arranged on the flexible substrate.

The display panel DP in accordance with an embodiment of the present disclosure may be a light emitting display panel and the present disclosure is not particularly limited thereto. For example, the display panel DP may be an organic light emitting display panel, a quantum dot display panel, a micro-light emitting diode (LED) display panel, or a nano-LED display panel. An emission layer of the organic light emitting display panel may include an organic light emitting material. An emission layer of the quantum dot display panel may include quantum dots and quantum rods. An emission layer of the micro-LED display panel may include micro-LEDs. An emission layer of the nano-LED display panel may include nano-LEDs. Hereinafter, the display panel DP is described as an organic light emitting display panel.

The input sensing part ISP may include a plurality of pen sensing electrodes (hereinafter illustrated in FIG. 8) for sensing the first input described above in an electromagnetic scheme (or an electromagnetic resonance scheme). The input sensing part ISP may include a plurality of sensing electrodes (hereinafter illustrated in FIG. 8) for sensing the second input described above in a capacitive scheme. The input sensing part ISP may be formed directly on the display panel DP during the manufacturing of the electronic panel EP.

The reflection prevention layer RPL may be arranged on the input sensing part ISP. The reflection prevention layer RPL may be formed directly on the input sensing part ISP during the manufacturing of the electronic panel EP. The reflection prevention layer RPL may be an external light reflection prevention film. The reflection prevention layer RPL may reduce the reflectance of external light incident from above the display device DD toward the display panel DP.

For example, the input sensing part ISP may be formed directly on the display panel DP and the reflection prevention layer RPL may be formed directly on the input sensing part ISP, but embodiments of the present disclosure are not limited thereto. For example, the input sensing part ISP may be manufactured separately and attached to the display panel DP by the adhesive layer and the reflection prevention layer RPL may be manufactured separately and attached to the input sensing part ISP by the adhesive layer.

Figure 5:
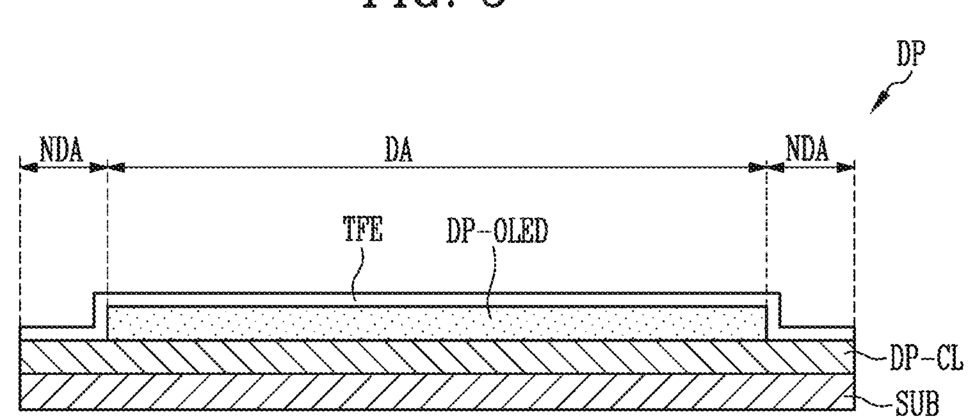
FIG. 5 is a cross-sectional view of a display panel in accordance with an embodiment of the present disclosure.
Figure 5:
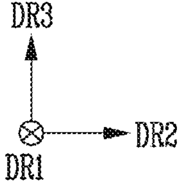

FIG. 5 is a cross-sectional view of a display panel in accordance with an embodiment of the present disclosure.

Referring to FIG. 5, a display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include a display area DA and a non-display area NDA around the display area DA. The substrate SUB may include a flexible plastic material such as PI.

The substrate SUB may be a member that provides a base surface on which the circuit element layer DP-CL is arranged. The substrate SUB may be a glass substrate, a metal substrate, or a polymer substrate. However, embodiments are not limited thereto, and the substrate SUB may be an inorganic layer, an organic layer, or a composite material layer.

The substrate SUB may have a multilayer structure. For example, the substrate SUB may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a PI-based resin. In addition, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. Meanwhile, in the present specification, the "ooo-based" resin refers to a resin that include a "000" functional group.

The circuit element layer DP-CL may be arranged on the substrate SUB. The circuit element layer DP-CL may include an insulating layer, a semiconductor pattern, a conductive pattern, and a signal line. After an insulating layer, a semiconductor layer, and a conductive layer are formed on the substrate SUB by a coating process, a deposition process, or the like, the insulating layer, the semiconductor layer, and the conductive layer may be selectively patterned by performing a photolithography process a plurality of times. Thereafter, the semiconductor pattern, the conductive pattern, and the signal line included in the circuit element layer DP-CL may be formed.

The display element layer DP-OLED may be arranged on the circuit element layer DP-CL. The display element layer DP-OLED may be arranged in the display area DA. A plurality of pixels (see PX of FIG. 6) may be arranged in the display area DA. Each of the pixels may include a light emitting element arranged on the display element layer DP-OLED and connected to a transistor on the circuit element layer DP-CL.

The thin-film encapsulation layer TFE may be arranged on the circuit element layer DP-CL to cover the display element layer DP-OLED. The thin-film encapsulation layer TFE may include inorganic layers and an organic layer disposed between the inorganic layers. The inorganic layers may protect the pixels from moisture/oxygen. The organic layer may protect the pixels from foreign materials such as dust particles.

Figure 6:
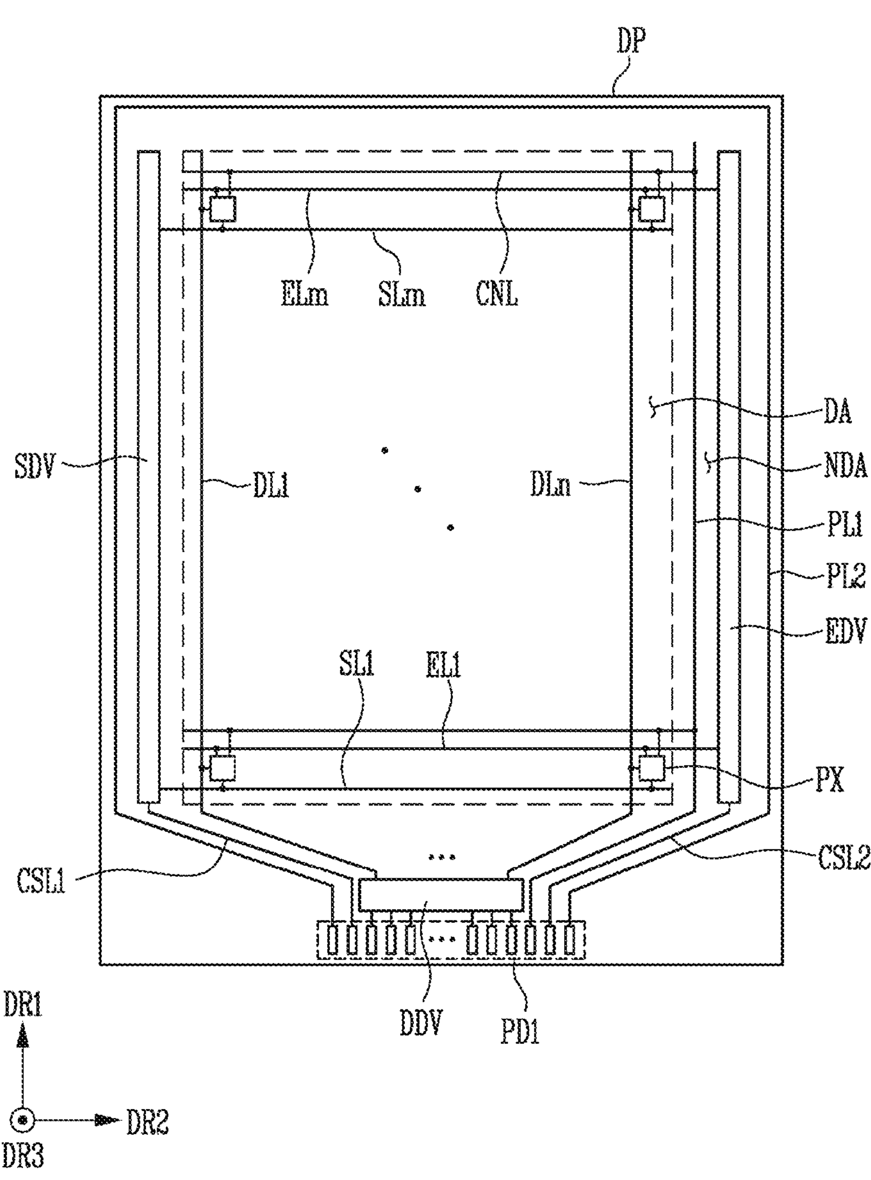
FIG. 6 is a plan view illustrating a portion of an electronic panel in accordance with an embodiment of the present disclosure.

FIG. 6 is a plan view illustrating a portion of an electronic panel in accordance with an embodiment of the present disclosure.

Referring to FIG. 6, the electronic panel (see EP of FIG. 4) may include a display panel DP, a scan driver SDV, a data driver DDV, a light emission driver EDV, and a plurality of first pads PD1.

The display panel DP may have a rectangular shape having long sides extending in the first direction DR1 and short sides extending in the second direction DR2, but the shape of the display panel DP is not limited thereto. The display panel DP may include a display area DA and a non-display area NDA surrounding the display area DA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, and connection lines CNL, where 'm' and 'n' are positive integers.

The pixels PX may be arranged in the display area DA. The scan driver SDV and the light emission driver EDV may be arranged in the non-display area NDA adjacent to each of the long sides of the display panel DP. The data driver DDV may be arranged in the non-display area NDA adjacent to any one of the short sides of the display panel DP. In a plan view, the data driver DDV may be disposed adjacent to the bottom end of the display panel DP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The emission lines EL1 to ELm may extend in the second direction DR2 and may be connected to the pixels PX and the light emission driver EDV.

The first power line PL1 may extend in the first direction DR1 and may be arranged in the non-display area NDA. The first power line PL1 may be arranged between the display area DA and the light emission driver EDV.

The connection lines CNL may extend in the second direction DR2, may be arranged in the first direction DR1, and may be connected to the first power line PL1 and the pixels PX. A first voltage may be applied to the pixels PX through the first power line PL1 and the connection lines CNL that are connected to each other.

The second power line PL2 may be arranged in the non-display area NDA and may extend along the long sides of the display panel DP and the other short side of the display panel DP where the data driver DDV is not arranged. The second power line PL2 may be arranged outside the scan driver SDV and the light emission driver EDV.

Although not illustrated, the second power line PL2 may extend toward the display area DA and may be connected to the pixels PX. A second voltage having a lower level than the first voltage may be applied to the pixels PX through the second power line PL2.

The first control line CSL1 may be connected to the scan driver SDV and may extend toward the bottom end of the display panel DP. The second control line CSL2 may be connected to the light emission driver SDV and may extend toward the bottom end of the display panel DP. The data driver DDV may be arranged between the first control line CSL1 and the second control line CSL2.

The first pads PD1 may be arranged in the non-display area NDA adjacent to the bottom end of the display panel DP and may be closer to the bottom end of the display panel DP than the data driver DDV. The data driver DDV, the first power line PL1, the second power line PL2, the first control line CSL1, and the second control line CSL2 may be connected to the first pads PD1. The data lines DL1 to DLn may be connected to the data driver DDV, and the data driver DDV may be connected to the first pads PD1 corresponding to the data lines DL1 to DLn.

Although not illustrated, the display device DD may further include a timing controller that controls the operations of the scan driver SDV, the data driver DDV, and the light emission driver EDV, and a voltage generator (not shown) that generates the first and second voltages. The timing controller and the voltage generator may be connected to the first pads PD1 through a printed circuit board. In an embodiment, the timing controller and/or the voltage generator may be integrated with the data driver DDV.

The scan driver SDV may generate a plurality of scan signals and the scan signals may be applied to the pixels PX through the scan lines SL1 to SLm. The data driver DDV may generate a plurality of data voltages and the data voltages may be applied to the pixels PX through the data lines DL1 to DLn. The light emission driver EDV may generate a plurality of emission signals and the emission signals may be applied to the pixels PX through the emission lines EL1 to ELm.

The data voltages may be applied to the pixels PX in response to the scan signals. The pixels PX may display images by emitting light with a luminance corresponding to the data voltages in response to the emission signals.

Figure 7:
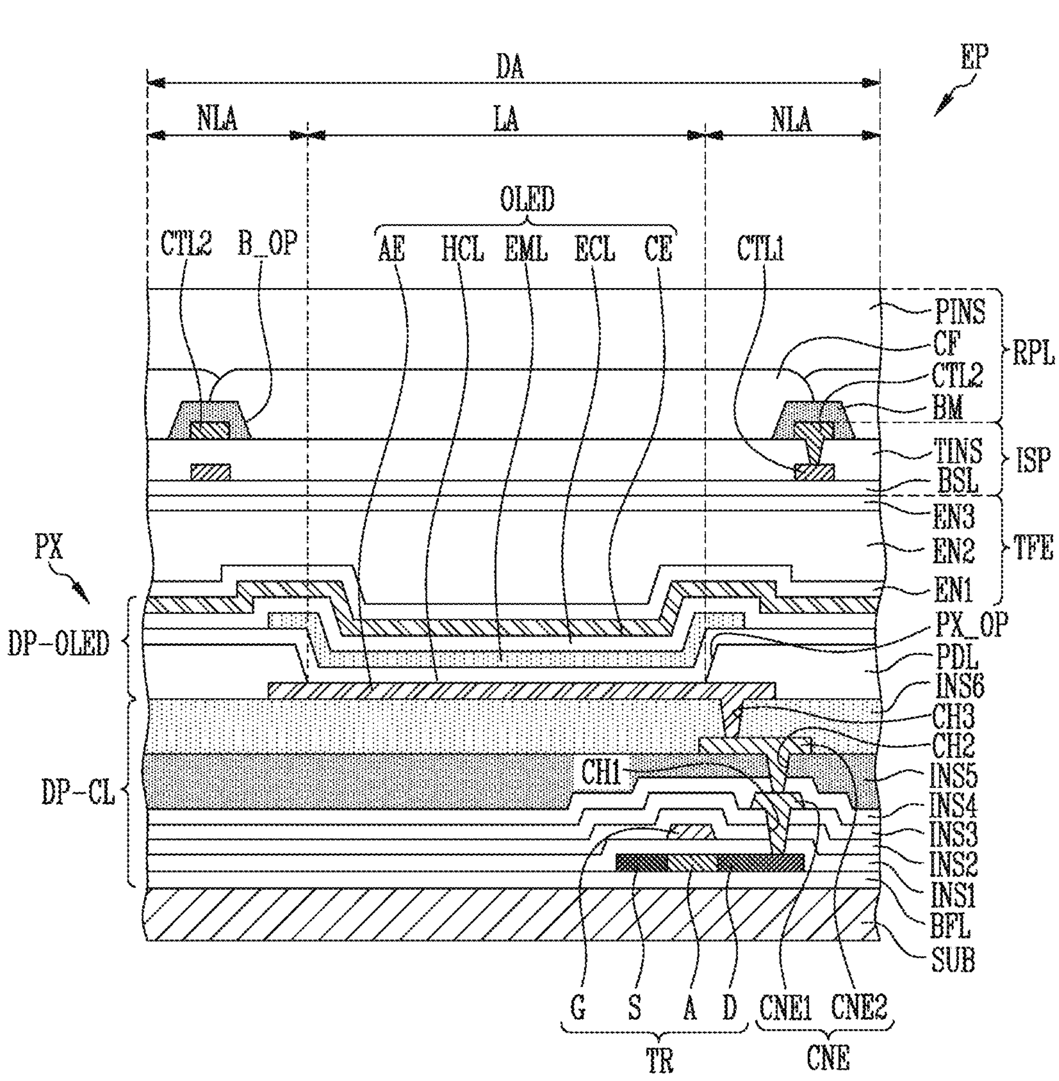
FIG. 7 is a cross-sectional view of an electronic panel in accordance with an embodiment of the present disclosure.

FIG. 7 is a cross-sectional view of an electronic panel in accordance with an embodiment of the present disclosure.

Referring to FIG. 7, a pixel PX may include a transistor TR and a light emitting element OLED. The light emitting element OLED may include a first electrode AE (or an anode), a second electrode CE (or a cathode), a hole control layer HCL, an electron control layer ECL, and an emission layer EML.

The transistor TR and the light emitting element OLED may be arranged on a substrate SUB. One transistor TR is illustrated as an example, but in practice, the pixel PX may include a plurality of transistors and at least one capacitor for driving the light emitting element OLED.

The display area DA may include an emission area LA corresponding to each of the pixels PX and a non-emission area NLA around the emission area LA. The light emitting element OLED may be arranged in the emission area LA.

A buffer layer BFL may be arranged on the substrate SUB, and the buffer layer BFL may be an inorganic layer. A semiconductor pattern may be arranged on the buffer layer BFL. The semiconductor pattern may include polysilicon, amorphous silicon, or metal oxide.

The semiconductor pattern may be doped with N-type dopant or P-type dopant. The semiconductor pattern may include a heavily doped region and a lightly doped region. The conductivity of the heavily doped region may be greater than the conductivity of the lightly doped region and may practically serve as a source electrode and a drain electrode of the transistor TR. The lightly doped region may practically correspond to an active area (or a channel) of the transistor.

A source S, an active area A, and a drain D of the transistor TR may be formed from the semiconductor pattern. A first insulating layer INS1 may be arranged on the semiconductor pattern. A gate G of the transistor TR may be arranged on the first insulating layer INS1. A second insulating layer INS2 may be arranged on the gate G. A third insulating layer INS3 may be arranged on the second insulating layer INS2.

A connection electrode CNE may include a first connection electrode CNE1 and a second connection electrode CNE2 which connect the transistor TR to the light emitting element OLED. The first connection electrode CNE1 may be arranged on the third insulating layer INS3 and may be connected to the drain D through a first contact hole CH1 defined in the first to third insulating layers INS1 to INS3.

A fourth insulating layer INS4 may be arranged on the first connection electrode CNE1. A fifth insulating layer INS5 may be arranged on the fourth insulating layer INS4.

The second connection electrode CNE2 may be arranged on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be arranged on the second connection electrode CNE2. The layers from the buffer layer BFL to the sixth insulating layer INS6 may be defined as a circuit element layer DP-CL. Each of the first to sixth insulating layers INS1 to INS6 may be an inorganic layer or an organic layer.

The first electrode AE may be arranged on the sixth insulating layer INS6. The first electrode AE may be connected to the second connection electrode CNE2 through the third contact hole CH3 defined in the sixth insulating layer INS6. A pixel defining layer PDL having a pixel defining layer opening PX_OP defined therein for exposing a certain portion of the first electrode AE may be arranged on the first electrode AE and the sixth insulating layer INS6.

The hole control layer HCL may be arranged on the first electrode AE and the pixel defining layer PDL. The hole control layer HCL may include a hole transport layer and a hole injection layer.

The emission layer EML may be arranged on the hole control layer HCL. The emission layer EML may be arranged in an area corresponding to the pixel defining layer opening PX_OP. The emission layer EML may include organic material and/or an inorganic material. The emission layer EML may emit light of any one of red, green, and blue colors.

The electron control layer ECL may be arranged on the emission layer EML and the hole control layer HCL. The electron control layer ECL may include an electron transport layer and an electron injection layer. The hole control layer HCL and the electron control layer ECL may be commonly arranged in the emission area LA and the non-emission area NLA.

The second electrode CE may be arranged on the electronic control layer ECL. The second electrode CE may be commonly arranged in the pixels PX. The layer in which the light emitting element OLED is arranged may be defined as a display element layer DP-OLED.

A thin-film encapsulation layer TFE may be arranged on the second electrode CE to cover the pixels PX. The thin-film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

Each of the first and third encapsulation layers EN1 and EN3 may include an inorganic insulating layer and may protect the pixels PX from moisture/oxygen. The second encapsulation layer EN2 may include an organic insulating layer and may protect the pixels PX from foreign materials such as dust particles.

A first voltage may be applied to the first electrode AE through the transistor TR, and a second voltage having a lower level than the first voltage may be applied to the second electrode CE. When holes and electrons injected into the emission layer EML recombine to form excitons, the light emitting element OLED may emit light when the excitons transition to a ground state.

An input sensing part ISP may be arranged on the thin-film encapsulation layer TFE. The input sensing part ISP may be manufactured directly on the upper surface of the thin-film encapsulation layer TFE.

A base layer BSL may be arranged on the thin-film encapsulation layer TFE. The base layer BSL may include an inorganic insulating layer. At least one inorganic insulating layer may be provided on the thin-film encapsulation layer TFE as the base layer BSL.

The input sensing part ISP may include a first conductive pattern CTL1 and a second conductive pattern CTL2 arranged on the first conductive pattern CTL1. The first conductive pattern CTL1 may be arranged on the base layer BSL. An insulating layer TINS may be arranged on the base layer BSL to cover the first conductive pattern CTL1. The insulating layer TINS may include an inorganic insulating layer or an organic insulating layer. The second conductive pattern CTL2 may be arranged on the insulating layer TINS.

The first and second conductive patterns CTL1 and CTL2 may overlap the non-emission area NLA. Although not illustrated, the first and second conductive patterns CTL1 and CTL2 may be arranged on the non-emission area NLA between the emission areas LA and may each have a mesh shape.

The first and second conductive patterns CTL1 and CTL2 may form the sensing electrodes and the pen sensing electrodes of the input sensing part ISP described above. For example, the first and second conductive patterns CTL1 and CTL2 each having a mesh shape may be separated from each other in a certain area to form the sensing electrodes and the pen sensing electrodes. A portion of the second conductive pattern CTL2 may be connected to the first conductive pattern CTL1.

A reflection prevention layer RPL may be arranged on the second conductive pattern CTL2. The reflection prevention layer RPL may include a black matrix BM and a plurality of color filters CF. The black matrix BM may overlap the non-emission area NLA and the color filters CF may overlap the emission areas LA.

The black matrix BM may be arranged on the insulating layer TINS to cover the second conductive pattern CTL2. A black matrix opening B_OP overlapping the emission area LA and the pixel defining layer opening PX_OP may be defined in the black matrix BM. The black matrix BM may absorb and block light. The width of the black matrix opening B_OP may be greater than the width of the pixel defining layer opening PX_OP. In an embodiment, the reflection prevention layer RPL may include at least two color filters CF overlapping each other in areas corresponding to the second conductive pattern CTL2. The at least two color filters CF overlapping each other may replace the black matrix BM.

The color filters CF may be arranged on the insulating layer TINS and the black matrix BM. The color filters CF may be respectively arranged in the black matrix openings B_OP. A planarization insulating layer PINS may be arranged on the color filters CF. The planarization insulating layer PINS may provide a flat upper surface. The planarization insulating layer PINS may include an organic insulating layer.

When external light directed toward the display panel DP is reflected from the display panel DP and provided again to an external user, the user may recognize the external light, like a mirror. To prevent this phenomenon, for example, the reflection prevention layer RPL may include a plurality of color filters CF that display the same color as the pixels PX of the display panel DP. The color filters CF may filter external light with the same colors as the pixels PX. In such cases, external light may not be visible to the user.

Figure 8:
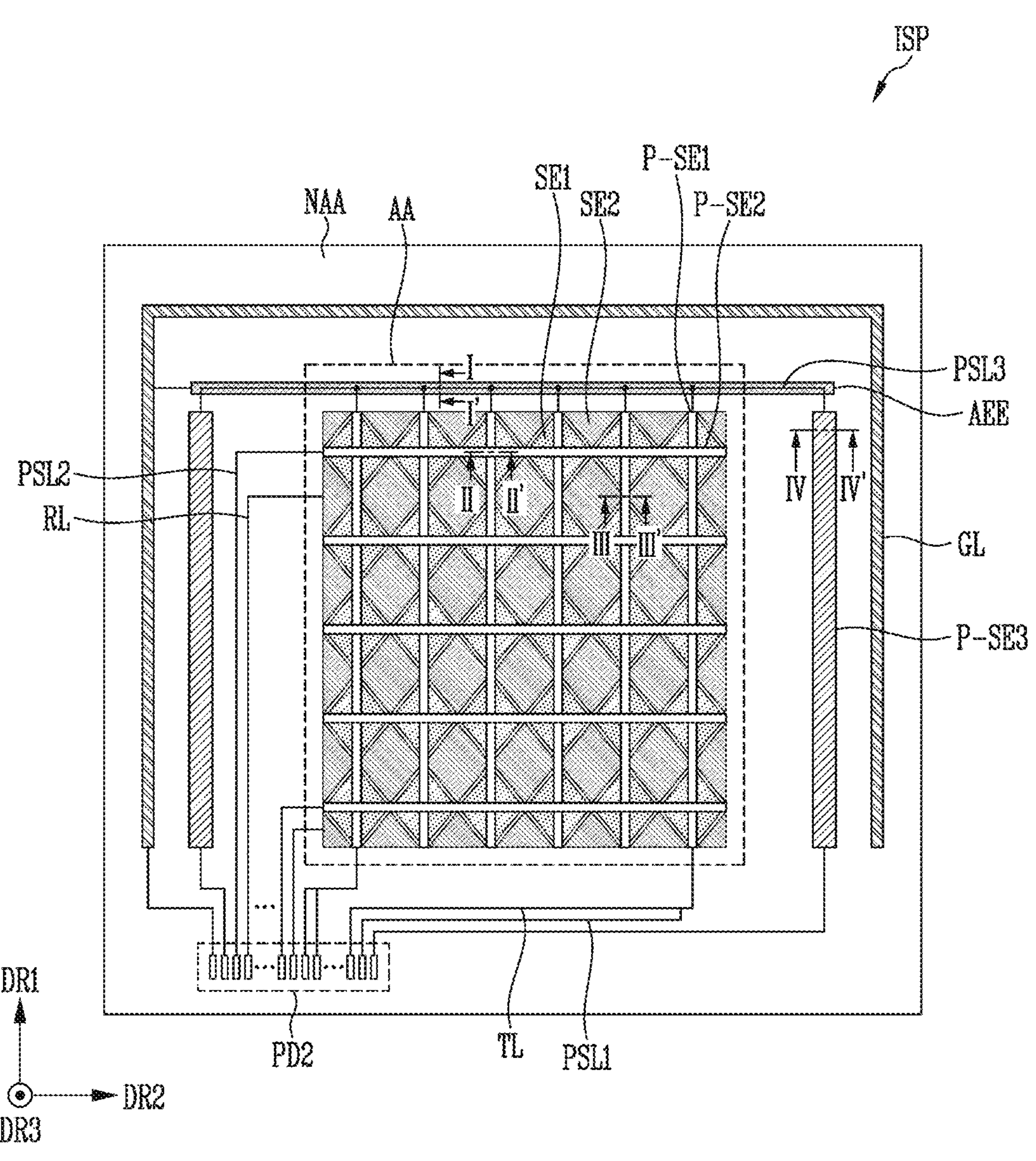
FIG. 8 is a plan view of an input sensing part in accordance with an embodiment of the present disclosure.

FIG. 8 is a plan view of an input sensing part in accordance with an embodiment of the present disclosure.

In FIG. 8 and FIGS. 16 to 19 described below, a first sensing line TL and a first pen sensing line PSL1 are illustrated as partially overlapping each other in a plan view. The first sensing line TL and the first pen sensing line PSL1 may be arranged on different layers. In an embodiment, in a plan view, the first sensing line TL and the first pen sensing line PSL1 may be arranged on the same layer and may not overlap each other.

Referring to FIGS. 7 and 8, an input sensing part ISP may include a base layer BSL, a plurality of sensing electrodes SE1 and SE2, a plurality of sensing lines TL and RL, a plurality of pen sensing electrodes P-SE1 and P-SE2, a plurality of pen sensing lines PSL1, PSL2, and PSL3, a peripheral pen sensing electrode P-SE3, and a plurality of second pads PD2.

An active area AA and a peripheral area NAA disposed adjacent to the active area AA may be defined in the base layer BSL. In a plan view, the active area AA may overlap the display area (see DA of FIG. 6), and the peripheral area NAA may overlap the non-display area (see NDA of FIG. 6).

The plurality of sensing electrodes SE1 and SE2 may be arranged in the active area AA and the second pads PD2 may be arranged in the peripheral area NAA. In a plan view, the second pads PD2 may be disposed adjacent to the bottom end of the input sensing part ISP.

For example, the second pads PD2 may be arranged adjacent to the left or right side of the input sensing part ISP. In a plan view, the first pads (see PD1 of FIG. 6) may be arranged adjacent to the second pads PD2.

In FIG. 8, the second pads PD2 are illustrated as being formed on the base layer BSL, but the arrangement relationship of the second pads PD2 according to an embodiment of the present disclosure is not limited thereto. For example, the second pads PD2 may be arranged adjacent to the first pads PD1 in the non-display area (see NDA of FIG. 6) disposed adjacent to the bottom end of the display panel (see DP of FIG. 6) and may be electrically connected to the input sensing part ISP through a contact hole.

The sensing electrodes SE1 and SE2 may include a plurality of first sensing electrodes SE1 extending in the first direction DR1 and arranged in the second direction DR2, and a plurality of second sensing electrodes SE2 extending in the second direction DR2 and arranged in the first direction DR1. The second sensing electrodes SE2 may extend to intersect with the first sensing electrodes SE1 while being insulated from each other. The first and second sensing electrodes SE1 and SE2 may be used to sense the second input described above.

For example, cells of each of the first sensing electrodes SE1 may be connected to each other in the first direction DR1, and cells of each of the second sensing electrodes SE2 may be connected to each other in the second direction DR2.

Each of the sensing lines TL and RL may be connected to one end of each of the first and second sensing electrodes SE1 and SE2, and may extend to the peripheral area NAA and be connected to each of the second pads PD2. The sensing lines TL and RL may include a plurality of first sensing lines TL respectively connected to the first sensing electrodes SE1 and a plurality of second sensing lines RL respectively connected to the second sensing electrodes SE2.

The first sensing lines TL may be connected to the bottom ends of the first sensing electrodes SE1. The first sensing lines TL may extend to the peripheral area NAA and may be respectively connected to the second pads PD2.

The second sensing lines RL may be connected to the left ends of the second sensing electrodes SE2. The second sensing lines RL may extend to the peripheral area NAA and may be respectively connected to the second pads PD2.

In the present embodiment, the second sensing lines RL are illustrated as being connected to the left ends of the second sensing electrodes SE2, but the present disclosure is not limited thereto. For example, the second sensing lines RL may be connected to the right ends of the second sensing electrodes SE2.

For example, in a plan view, the first sensing lines TL may be arranged in the peripheral area NAA disposed adjacent to the lower side of the active area AA. In addition, in a plan view, the second sensing lines RL may be arranged in the peripheral area NAA disposed adjacent to the left side of the active area AA.

The pen sensing electrodes P-SE1 and P-SE2 may be arranged in the active area AA. The pen sensing lines PSL1, PSL2, and PSL3 may be connected to the pen sensing electrodes P-SE1 and P-SE2, may extend to the peripheral area, and may be connected to the corresponding second pads PD2.

Although not illustrated, a touch circuit that controls the input sensing part ISP may be connected to the second pads PD2 through a printed circuit board.

The pen sensing electrodes P-SE1 and P-SE2 may include a plurality of first pen sensing electrodes P-SE1 extending in the first direction DR1 and arranged in the second direction DR2, and a plurality of second pen sensing electrodes P-SE2 extending in the second direction DR2 and arranged in the first direction DR1. The first and second pen sensing electrodes P-SE1 and P-SE2 may be used to sense the first input described above.

The second pen sensing electrodes P-SE2 may extend to intersect with the first pen sensing electrodes P-SE1 while being insulated from each other. The pen sensing electrodes P-SE1 and P-SE2 may extend to be insulated from the sensing electrodes SE1 and SE2. For example, the first conductive pattern CTL1 may form the pen sensing electrodes P-SE1 and PSE-2, and the second conductive pattern CTL2 may form the sensing electrodes SE1 and SE2. For example, in an area where the first pen sensing electrode P-SE1 and the second pen sensing electrode P-SE2 intersect with each other, the first pen sensing electrode P-SE1 and the second pen sensing electrode P-SE2 may be connected in a bridge shape through the first connection pattern (see CP1 of FIG. 12), and the sensing electrodes SE1 and SE2 may not be arranged in the area. For example, in an area where the first sensing electrode SE1 and the second sensing electrode SE2 intersect with each other, the first sensing electrode SE1 and the second sensing electrode SE2 may be connected in a bridge shape through the second connection pattern (see CP2 of FIG. 13), and the pen sensing electrodes P-SE1 and P-SE2 may not be arranged in the area. However, the present disclosure is not limited to the connection method of the first sensing electrode SE1 and the second sensing electrode SE2 or the first pen sensing electrode P-SE1 and the second pen sensing electrode P-SE2.

In the present embodiment, the sensing electrodes SE1 and SE2 and the pen sensing electrodes P-SE1 and P-SE2 are illustrated as being formed on different layers, but the present disclosure is not limited thereto, and it is sufficient if the sensing electrodes SE1 and SE2 and the pen sensing electrodes P-SE1 and P-SE2 are insulated from each other.

The pen sensing lines PSL1, PSL2, and PSL3 may include a plurality of first pen sensing lines PSL1, a plurality of second pen sensing lines PSL2, and a plurality of third pen sensing lines PSL3. The first pen sensing lines PSL1 and the third pen sensing lines PSL3 may be connected to the first pen sensing electrodes P-SE1. The second pen sensing lines PSL2 may be connected to the second pen sensing electrodes P-SE2.

The left ends of the second pen sensing electrodes P-SE2 may be connected to the corresponding second pen sensing lines PSL2 among the second pen sensing lines PSL2. The right ends of the second pen sensing electrodes P-SE2 may not be connected to each other. The second pen sensing lines PSL2 connected to the second pen sensing electrodes P-SE2 may be connected to the corresponding second pads PD2.

In the present embodiment, the second pen sensing lines PSL2 are illustrated as being connected to the left ends of the second pen sensing electrodes P-SE2, but the present disclosure is not limited thereto. For example, the second pen sensing lines PSL2 may be connected to the right ends of the second pen sensing electrodes P-SE2.

The first pen sensing electrodes P-SE1 may be connected to the first pen sensing lines PSL1. The first pen sensing lines PSL1 connected to the first pen sensing electrodes P-SE1 may be connected to the corresponding second pads PD2.

The first pen sensing electrodes P-SE1 may be connected to the third pen sensing lines PSL3. The input sensing part ISP may further include an additional electrode AEE that is insulated from the third pen sensing line PSL3 and overlaps at least a portion of the third pen sensing line PSL3 in a plan view.

The third pen sensing line PSL3 may be disposed adjacent to the active area AA in the first direction DR1, and the second pads PD2 may be disposed adjacent to the active area AA in a direction opposite to the first direction DR1.

A reference voltage may be applied to the additional electrode AEE. In an embodiment, the additional electrode AEE may be connected to a guard line GL to which the reference voltage is applied. For example, the reference voltage may be a DC voltage. For example, the reference voltage may be a ground voltage.

The first pen sensing electrode P-SE1 may transmit a signal to the touch circuit or receive a signal from the touch circuit through the second pads PD2. In this case, the intensity of the signal may decrease as the distance from the touch circuit increases. However, the degree of reduction in the intensity of the signal may be compensated by overlapping the additional electrode AEE with the third pen sensing line PSL3 with an insulating layer disposed therebetween to form a capacitor. Accordingly, the sensing reliability of the input sensing part ISP may be improved.

The peripheral pen sensing electrode P-SE3 may be arranged in the peripheral area NAA. The peripheral pen sensing electrode P-SE3 may extend in the first direction DR1. In a plan view, the area of the peripheral pen sensing electrode P-SE3 may be greater than the area of each of the plurality of sensing lines TL and RL and the plurality of pen sensing lines PSL1, PSL2, and PSL3. The width of each of the plurality of sensing lines TL and RL and the plurality of pen sensing lines PSL1, PSL2, and PSL3 in the second direction DR2 may be smaller than the width of the peripheral pen sensing electrode P-SE3 in the second direction DR2.

The peripheral pen sensing electrode P-SE3 may be provided in plurality. The plurality of peripheral pen sensing electrodes P-SE3 may be spaced apart from each other in the second direction DR2 with the active area AA disposed therebetween. The plurality of peripheral pen sensing electrodes P-SE3 may be connected to the third pen sensing line PSL3. That is, the plurality of peripheral pen sensing electrodes P-SE3 may be electrically connected to the first pen sensing electrode P-SE1 through the third pen sensing line PSL3.

One of the plurality of peripheral pen sensing electrodes P-SE3 may be arranged on the left side of the input sensing part ISP and connected to the corresponding second pad PD2. Another of the plurality of peripheral pen sensing electrodes P-SE3 may be arranged on the right side of the input sensing part ISP and connected to the corresponding second pad PD2.

The input sensing part ISP may be driven in a time-division manner and driven in a first sensing period and a second sensing period. The first sensing period and the second sensing period may be repeated. During the first sensing period, the first and second sensing electrodes SE1 and SE2 may be driven so that the second input by the user's touch may be sensed. During the second sensing period, the first input by the input device (see PN of FIG. 1) may be sensed by the first and second pen sensing electrodes P-SE1 and P-SE2.

According to the present disclosure, since the second input by the user's touch and the first input of the input device PN are performed in the same input sensing part ISP, two input devices such as a touch panel and a digitizer are not used, so that the thickness of the display device (see DD of FIG. 1) may be reduced.

The input sensing part ISP may be arranged in the peripheral area NAA and may further include a guard line GL that at least partially surrounds the active area AA. For example, the guard line GL may surround the active area AA in the first direction DR1, the second direction DR2, and the direction opposite to the second direction DR2.

In the present embodiment, the guard line GL is illustrated as surrounding the active area AA in the first direction DR1, the second direction DR2, and the direction opposite to the second direction DR2, but the present disclosure is not limited thereto.

The guard line GL may be formed as a conductive pattern. The guard line GL may be connected to a pad to which the reference voltage is applied among the second pads PD2. The guard line GL may minimize the influence of the signals received from lines (not shown) outside the guard line GL on the sensing electrodes SE1 and SE2, the pen sensing electrodes P-SE1 and P-SE2, and the peripheral pen sensing electrodes P-SE3. The guard line GL may minimize the influence of externally applied static electricity on the sensing electrodes SE1 and SE2, the pen sensing electrodes P-SE1 and P-SE2, and the peripheral pen sensing electrodes P-SE3.

In the present embodiment, only one end of the guard line GL is illustrated as being connected to the pad to which the reference voltage is applied among the second pads PD2, but the present disclosure is not limited thereto, and the other end of the guard line GL may also be connected to the pad to which the reference voltage is applied among the second pads PD2.

Figure 9:
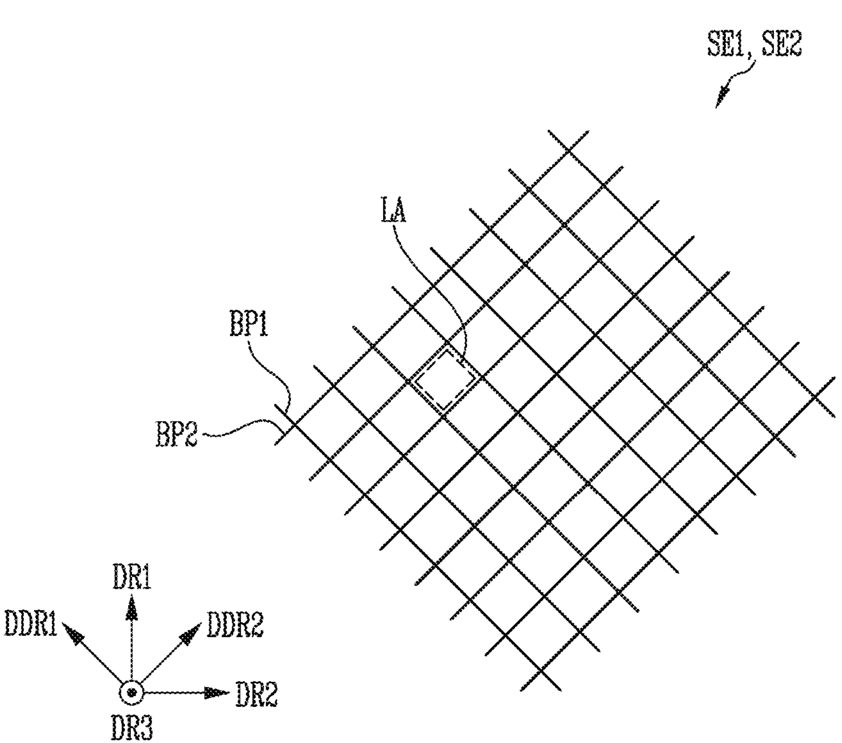
FIG. 9 is a plan view illustrating a cell of a sensing electrode in accordance with an embodiment of the present disclosure.

FIG. 9 is a plan view illustrating a cell of a sensing electrode in accordance with an embodiment of the present disclosure.

For convenience of explanation, FIG. 9 does not illustrate an empty space of the cell. However, in an area where the first pen sensing electrode (see P-SE1 of FIG. 8) and the second pen sensing electrode (see P-SE2 of FIG. 8) intersect with each other, the cell may include an empty space for forming a bridge of the first pen sensing electrode (see P-SE1 of FIG. 8) or the second pen sensing electrode (see P-SE2 of FIG. 8).

Referring to FIG. 9, each of the sensing electrodes SE1 and SE2 may have a mesh shape. For example, each of the sensing electrodes SE1 and SE2 may include a plurality of first branches BP1 extending in a first diagonal direction DDR1 and a plurality of second branches BP2 extending in a second diagonal direction DDR2.

The first diagonal direction DDR1 may be defined as a direction intersecting with the first and second directions DR1 and DR2 in a plan view. The second diagonal direction DDR2 may be defined as a direction intersecting with the first diagonal direction DDR1 in a plan view.

The first and second branches BP1 and BP2 may be connected to each other to form a single body. The mesh shape of the sensing electrodes SE1 and SE2 may be formed by the first and second branches BP1 and BP2.

Rhombus-shaped openings may be defined by the first and second branches BP1 and BP2. The emission areas LA of the pixels (see PX of FIG. 7) may be respectively arranged in the rhombus-shaped openings. Therefore, the first and second branches BP1 and BP2 may overlap the non-emission area (see NLA of FIG. 7). That is, the sensing electrodes SE1 and SE2 may overlap the non-emission area (see NLA of FIG. 7).

Since the first and second branches BP1 and BP2 are arranged in the non-emission area (see NLA of FIG. 7), light generated from the light emitting elements (see OLED of FIG. 7) of the pixels (see PX of FIG. 7) may be normally emitted without being affected by the sensing electrodes SE1 and SE2.

Figure 10:
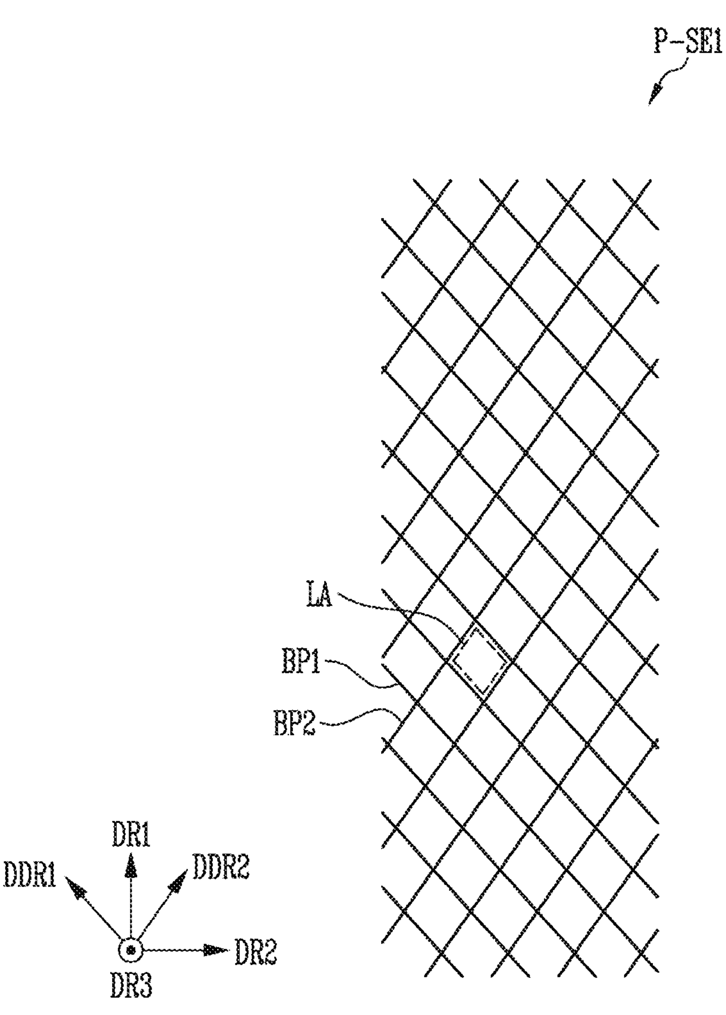
FIG. 10 is a plan view of a first pen sensing electrode in accordance with an embodiment of the present disclosure.

FIG. 10 is a plan view of a first pen sensing electrode in accordance with an embodiment of the present disclosure.

For convenience of explanation, FIG. 10 illustrates only the first pen sensing electrode P-SE1, but the second pen sensing electrode (see P-SE2 of FIG. 9) illustrated in FIG. 9 may also have a mesh shape in the same manner as the configuration illustrated in FIG. 10 except for the extending direction thereof.

Referring to FIG. 10, each of the pen sensing electrodes P-SE1 and P-SE2 may have a mesh shape. For example, each of the pen sensing electrodes P-SE1 and P-SE2 may include a plurality of first branches BP1 extending in a first diagonal direction DDR1 and a plurality of second branches BP2 extending in a second diagonal direction DDR2.

The first and second branches BP1 and BP2 may be connected to each other to form a single body. The mesh shape of the pen sensing electrodes P-SE1 and P-SE2 may be defined by the first and second branches BP1 and BP2.

Rhombus-shaped openings may be defined by the first and second branches BP1 and BP2. The emission areas LA of the pixels (see PX of FIG. 7) may be respectively arranged in the rhombus-shaped openings. Therefore, the first and second branches BP1 and BP2 may overlap the non-emission area (see NLA of FIG. 7). That is, the pen sensing electrodes P-SE1 and P-SE2 may overlap the non-emission area (see NLA of FIG. 7).

Since the first and second branches BP1 and BP2 are arranged in the non-emission area (see NLA of FIG. 7), light generated from the light emitting elements (see OLED of FIG. 7) of the pixels (see PX of FIG. 7) may be normally emitted without being affected by the sensing electrodes SE1 and SE2.

Figure 11:
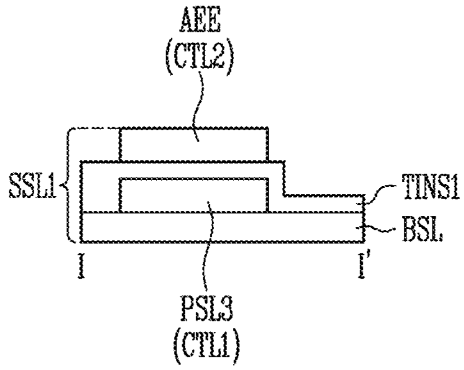
FIG. 11 is a cross-sectional view taken along line I-I' of FIG. 8 in accordance with an embodiment of the present disclosure.
Figure 12:
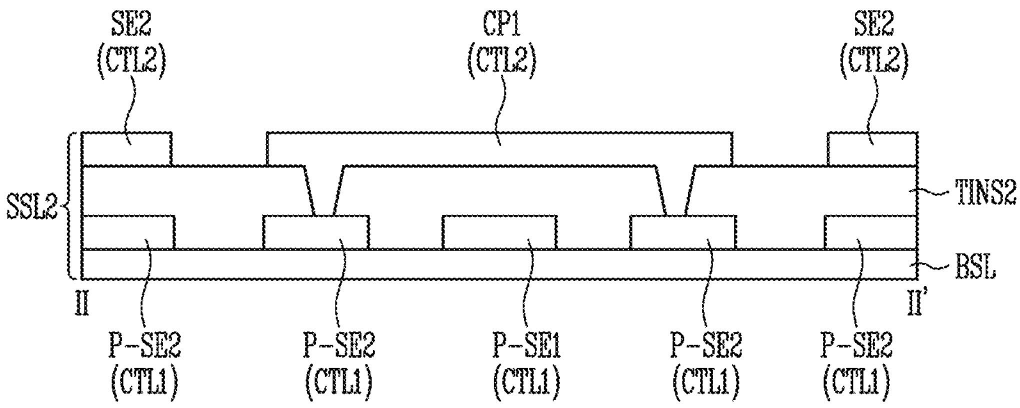
FIG. 12 is a cross-sectional view taken along line II-II' of FIG. 8 in accordance with an embodiment of the present disclosure.
Figure 13:
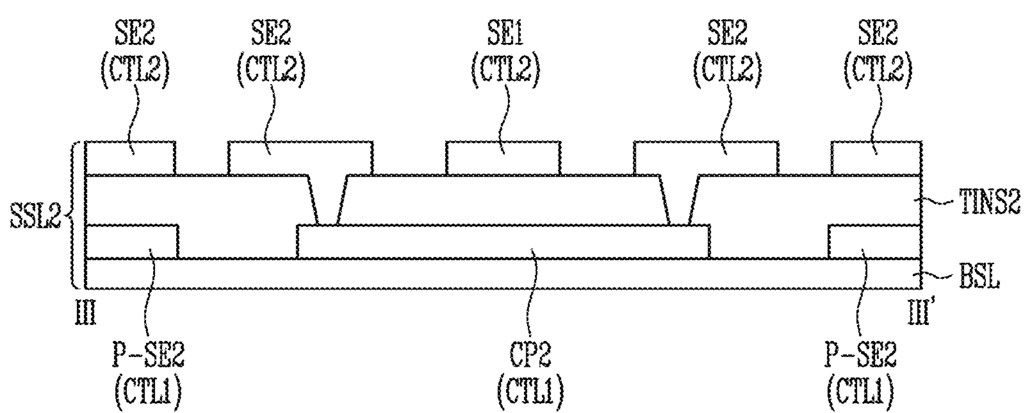
FIG. 13 is a cross-sectional view taken along line III-III' of FIG. 8 in accordance with an embodiment of the present disclosure.
Figure 14:
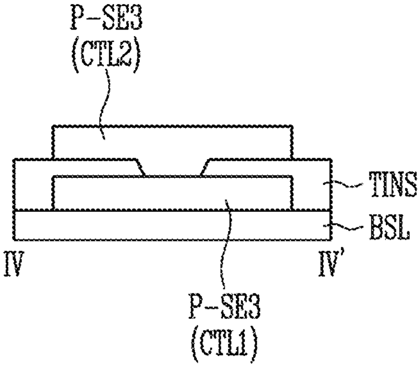
FIG. 14 is a cross-sectional view taken along line IV-IV' of FIG. 8 in accordance with an embodiment of the present disclosure.

FIG. 11 is a cross-sectional view taken along line I-I' of FIG. 8 in accordance with an embodiment of the present disclosure, FIG. 12 is a cross-sectional view taken along line II-II' of FIG. 8 in accordance with an embodiment of the present disclosure, FIG. 13 is a cross-sectional view taken along line III-III' of FIG. 8 in accordance with an embodiment of the present disclosure, and FIG. 14 is a cross-sectional view taken along line IV-IV' of FIG. 8 in accordance with an embodiment of the present disclosure.

For convenience of explanation, components other than a base layer BSL, a first conductive pattern CTL1, insulating layers TINS, TINS1, and TINS2, and a second conductive pattern CTL2 are omitted in FIGS. 11 to 14.

Referring to FIG. 11, a third pen sensing line PSL3 may be formed by the first conductive pattern CTL1, and an additional electrode AEE may be formed by the second conductive pattern CTL2. The third pen sensing line PSL3 may overlap the additional electrode AEE with an insulating layer disposed therebetween to form a capacitor.

The first insulating layer TINS1 may be arranged between at least a portion of the third pen sensing line PSL3 and the additional electrode AEE. The first insulating layer TINS1 may be an inorganic insulating layer including an inorganic material.

Referring to FIGS. 8, 12, and 13, the sensing electrodes SE1 and SE2 may be formed by the second conductive pattern CTL2, and the pen sensing electrodes P-SE1 and P-SE2 may be formed by the first conductive pattern CTL1.

A first connection pattern CP1 and a second connection pattern CP2 may be arranged on the base layer BSL. The first connection pattern CP1 may be formed by the second conductive pattern CTL2, and the second connection pattern CP2 may be formed by the first conductive pattern CTL1.

In an area where the first pen sensing electrode P-SE1 and the second pen sensing electrode P-SE2 intersect with each other, the first connection pattern CP1 may connect the first conductive patterns CTL1 forming the second pen sensing electrode P-SE2. For example, the first conductive patterns CTL1 forming the second pen sensing electrode P-SE2 may be connected in a bridge form through the first connection pattern CP1. The sensing electrodes SE1 and SE2 may not be arranged in an area where the first connection pattern CP1 is formed, for example, in an area in which the first pen sensing electrode P-SE1 and the second pen sensing electrode P-SE2 intersect with each other.

In the present embodiment, the first connection pattern CP1 is illustrated as connecting the first conductive patterns CTL1 forming the second pen sensing electrode P-SE2, but the present disclosure is not limited thereto. For example, the first connection pattern CP1 may connect the first conductive patterns CTL1 forming the first pen sensing electrode P-SE1.

In an area where the first sensing electrode SE1 and the second sensing electrode SE2 intersect with each other, the second connection pattern CP2 may connect the second conductive patterns CTL2 forming the second sensing electrode SE2. For example, the second conductive patterns CTL2 forming the second sensing electrode SE2 may be connected in a bridge form through the second connection pattern CP2. The pen sensing electrodes P-SE1 and P-SE2 may not be arranged in an area where the second conductive patterns CTL2 is formed, for example, in an area in which the first sensing electrode SE1 and the second sensing electrode SE2 intersect with each other.

In the present embodiment, the second connection pattern CP2 is illustrated as connecting the second conductive patterns CTL2 forming the second sensing electrode SE2, but the present disclosure is not limited thereto. For example, the second connection pattern CP2 may connect the second conductive patterns CTL2 forming the first sensing electrode SE1.

The second insulating layer TINS2 may be arranged between the pen sensing electrodes P-SE1 and P-SE2 and the sensing electrodes SE1 and SE2. The second insulating layer TINS2 may be an inorganic insulating layer including an inorganic material or an organic insulating layer including an organic material. When an organic insulating layer is used, the step difference caused by the pen sensing electrodes P-SE1 and P-SE2 may be. Accordingly, for planarization, an organic insulating layer may be used between the sensing electrodes SE1 and SE2 and the pen sensing electrodes P-SE1 and P-SE2.

Referring to FIGS. 11 to 13, the thickness of the first sensing layer SSL1 including at least a portion of the third pen sensing line PSL3, the additional electrode AEE, and the first insulating layer TINS1 may be less than the thickness of the second sensing layer SSL2 including the pen sensing electrodes P-SE1 and P-SE2, the sensing electrodes SE1 and SE2, and the second insulating layer TINS2.

By forming the insulating layer disposed between the third pen sensing line PSL3 and the additional electrode AEE thinner than the insulating layer disposed between the pen sensing electrodes P-SE1 and P-SE2 and the sensing electrodes SE1 and SE2, the capacitance of the capacitor formed by the third pen sensing line PSL3, the additional electrode AEE and the insulating layer TINS1 disposed between the third pen sensing line PSL3, the additional electrode AEE may be improved and compensation for the degree of signal reduction may be more effectively achieved.

Referring to FIG. 14, a peripheral pen sensing electrode P-SE3 may be formed by the first conductive pattern CTL1 and the second conductive pattern CTL2. The first conductive pattern CTL1 forming the peripheral pen sensing electrode P-SE3 may be electrically connected to the second conductive pattern CTL2 forming the peripheral pen sensing electrode P-SE3.

Figure 15:
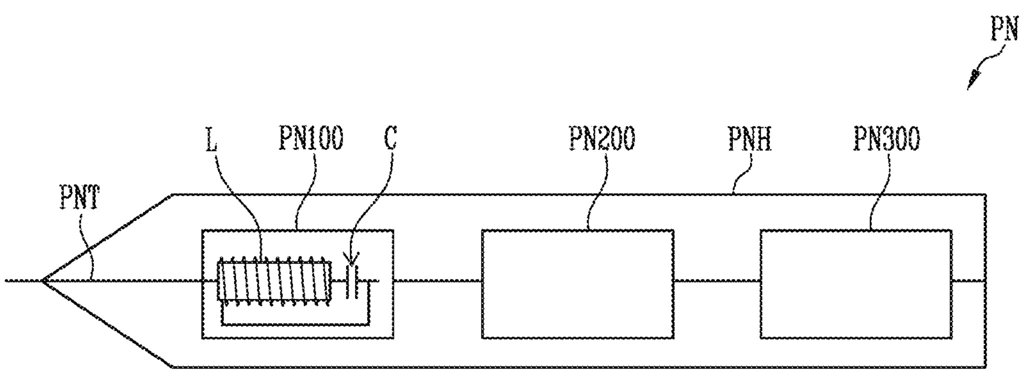
FIG. 15 is a block diagram of an input device in accordance with an embodiment of the present disclosure.

FIG. 15 is a block diagram of an input device in accordance with an embodiment of the present disclosure.

Referring to FIG. 15, an input device PN may include a housing PNH, a pen tip PNT, a resonance circuit PN100, a controller PN200, and a power supply PN300.

The housing PNH may have a pen shape. An accommodation space may be formed inside the housing PNH. The resonance circuit PN100, the controller PN200, and the power supply PN300 may be accommodated in the accommodation space defined inside the housing PNH.

The pen tip PNT may be arranged at an end portion of the housing PNH. For example, a portion of the pen tip PNT may be exposed to the outside of the housing PNH, and the remaining portion of the pen tip PNT may be inserted into the housing PNH. The resonance circuit PN100 may be configured to generate a signal. The resonance circuit PN100 may include a special-purpose integrated circuit or an oscillator. The resonance circuit PN100 may output an AC signal having a frequency of a certain value.

The resonance circuit PN100 may include an inductor L and a capacitor C connected to the inductor L. An LC resonance circuit may be formed by the inductor L and the capacitor C. The capacitor C may be a variable capacitor with variable capacitance. The input device PN may be arranged on the display device DD, and the capacitor C may be charged during a charging period.

In the resonance circuit PN100, an induced current may be generated from the display device DD, and a magnetic field may be generated by resonance caused by the induced current.

The power supply PN300 may supply power to the controller PN200. The power supply PN300 may include a battery or a high-capacity capacitor. However, this is only an example, and the power supply PN300 in accordance with an embodiment of the present disclosure may be omitted.

Figure 16:
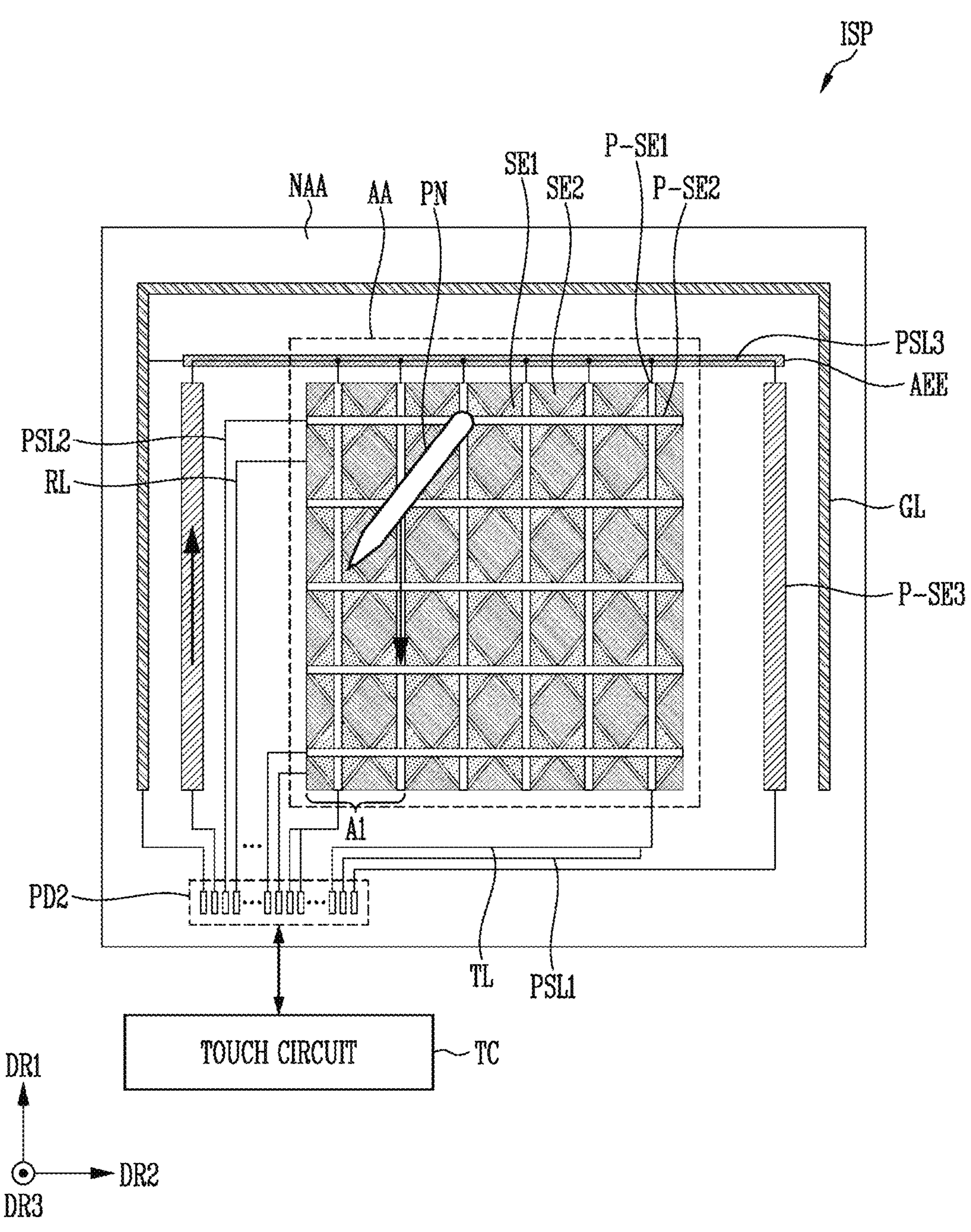
FIGS. 16, 17 and 18 are diagrams for describing a charging operation of a pen arranged on an input sensing part in accordance with an embodiment of the present disclosure.
Figure 17:
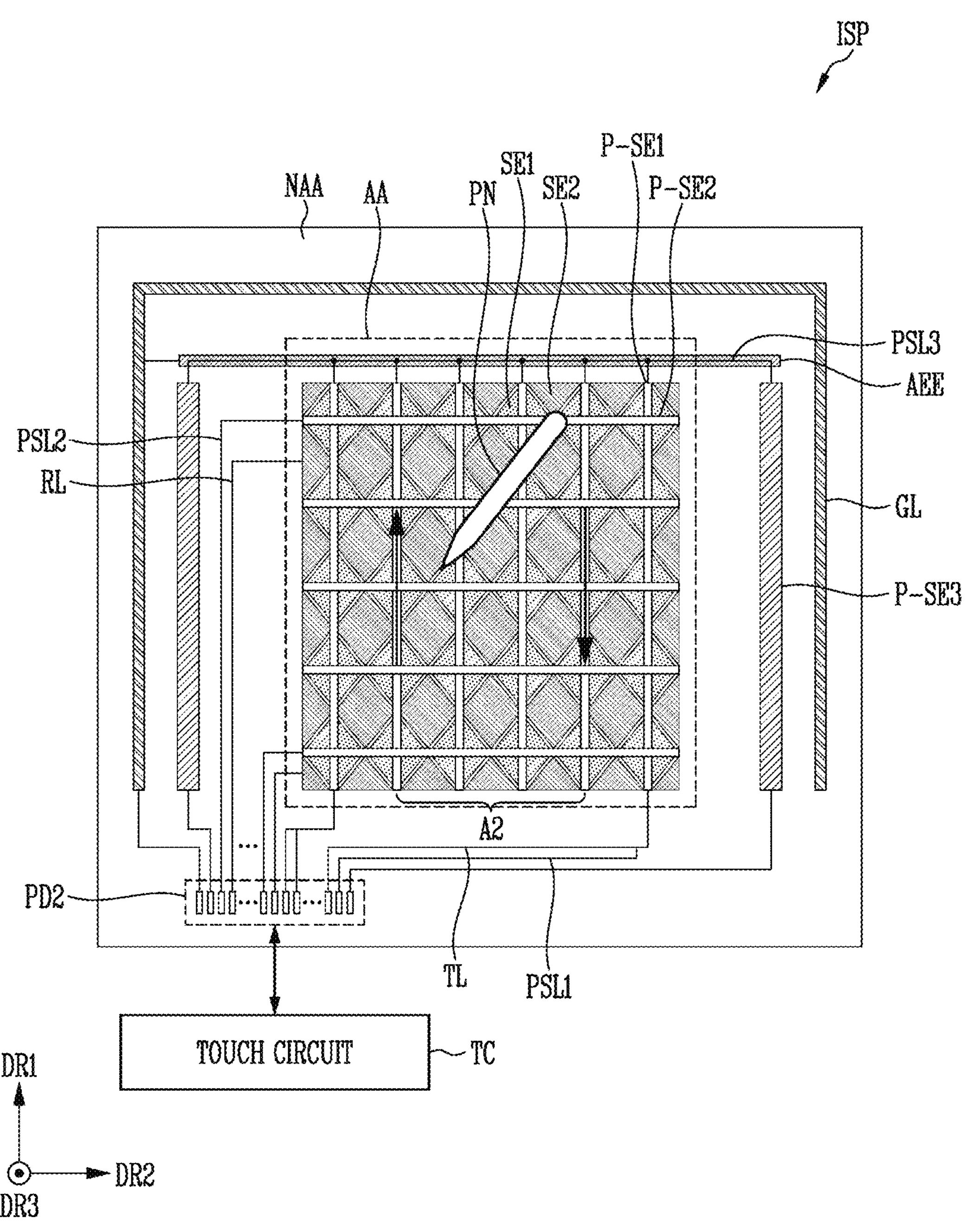
Figure 18:
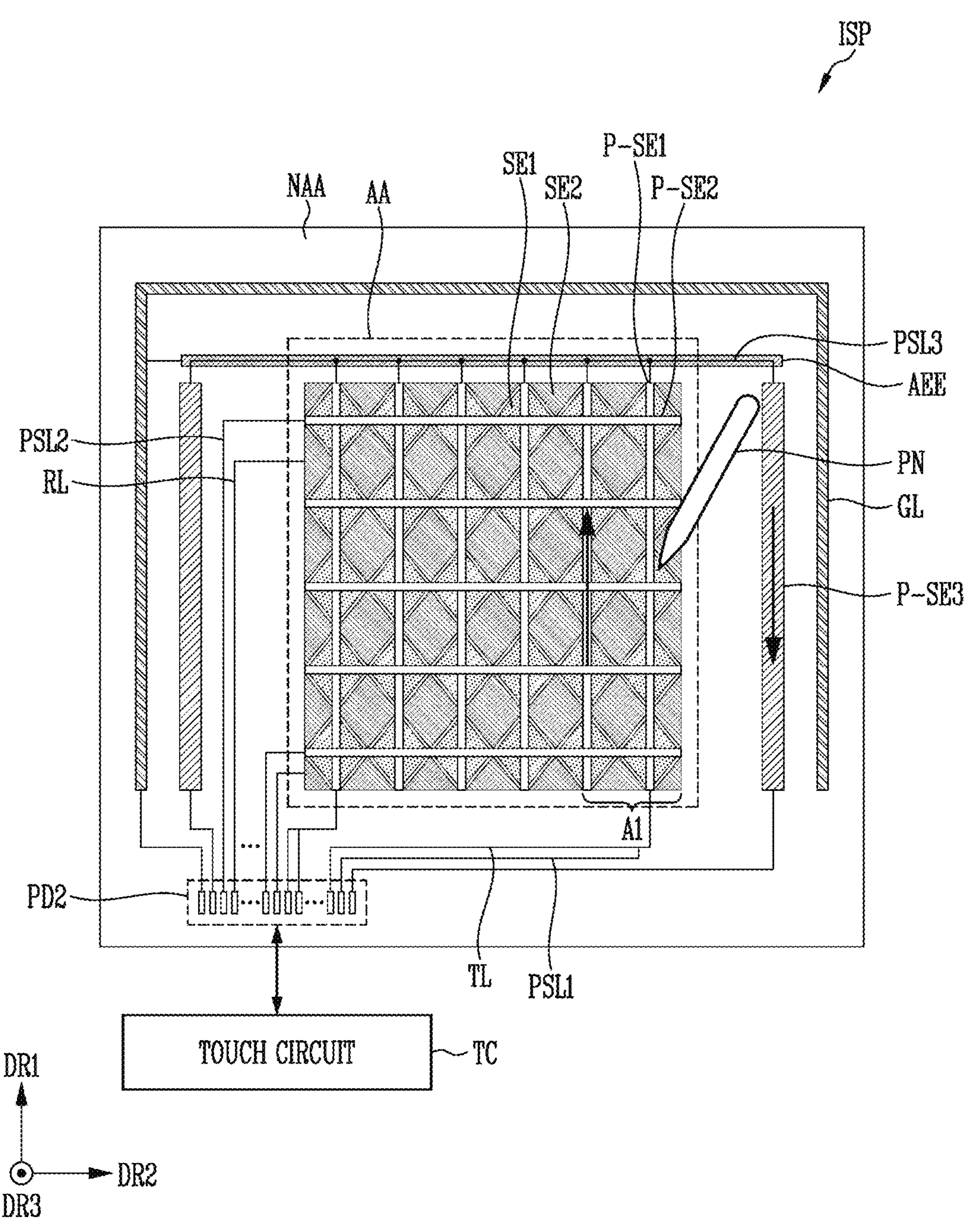

FIGS. 16 to 18 are diagrams for describing a charging operation of a pen arranged on an input sensing part in accordance with an embodiment of the present disclosure. In describing FIGS. 16 to 18, the same reference numerals are used for elements described with reference to FIG. 8, and a description thereof is omitted.

Although a timing is not illustrated, the second sensing period described above may include a charging period and a pen sensing period following the charging period. During the charging period, at least two of the first pen sensing electrodes P-SE1 and the peripheral pen sensing electrodes P-SE3 may be driven to form a coil.

Specifically, the second pads PD2 may be connected to the touch circuit TC. The touch circuit TC may apply driving signals to the peripheral pen sensing electrodes P-SE3 and the first pen sensing electrodes P-SE1 in certain order.

Referring to FIGS. 15 and 16, in a plan view, the input device PN may be arranged between the left peripheral pen sensing electrode P-SE3 and the right first pen sensing electrode P-SE1 of a first area A1.

In a first period of the charging period, the touch circuit TC may be connected to the second pad PD2 to which the peripheral pen sensing electrode P-SE3 arranged on the left side is connected and the second pad PD2 to which the first pen sensing electrode P-SE1 arranged on the right side of the first area A1 is connected. The touch circuit TC may apply a driving current to the second pad PD2 to which the peripheral pen sensing electrode P-SE3 arranged on the left side is connected and the second pad PD2 to which the first pen sensing electrode P-SE1 arranged on the right side of the first area A1 is connected.

In this case, a magnetic flux may be generated by the driving current flowing through the peripheral pen sensing electrode P-SE3 arranged on the left side, the first pen sensing electrode P-SE1 arranged on the right side of the first area A1, and the third pen sensing line PSL3. The magnetic flux may flow into a ferrite core surrounding a coil of the inductor L of the input device PN, thus an induced current may be generated in the coil of the inductor L. The capacitor C may be charged by the induced current.

A constant voltage may be applied to the second pen sensing electrodes P-SE2 through the second pen sensing lines PSL2 during the charging period.

That is, in the first period, the input device PN located in the first area A1 may be charged.

Substantially the same as described with reference to FIG. 16, the input device PN located in a second area A2 may be charged in a second period of the charging period (see FIG. 17), and the input device PN located in a third area A3 may be charged in a third period of the charging period (see FIG. 18).

Figure 19:
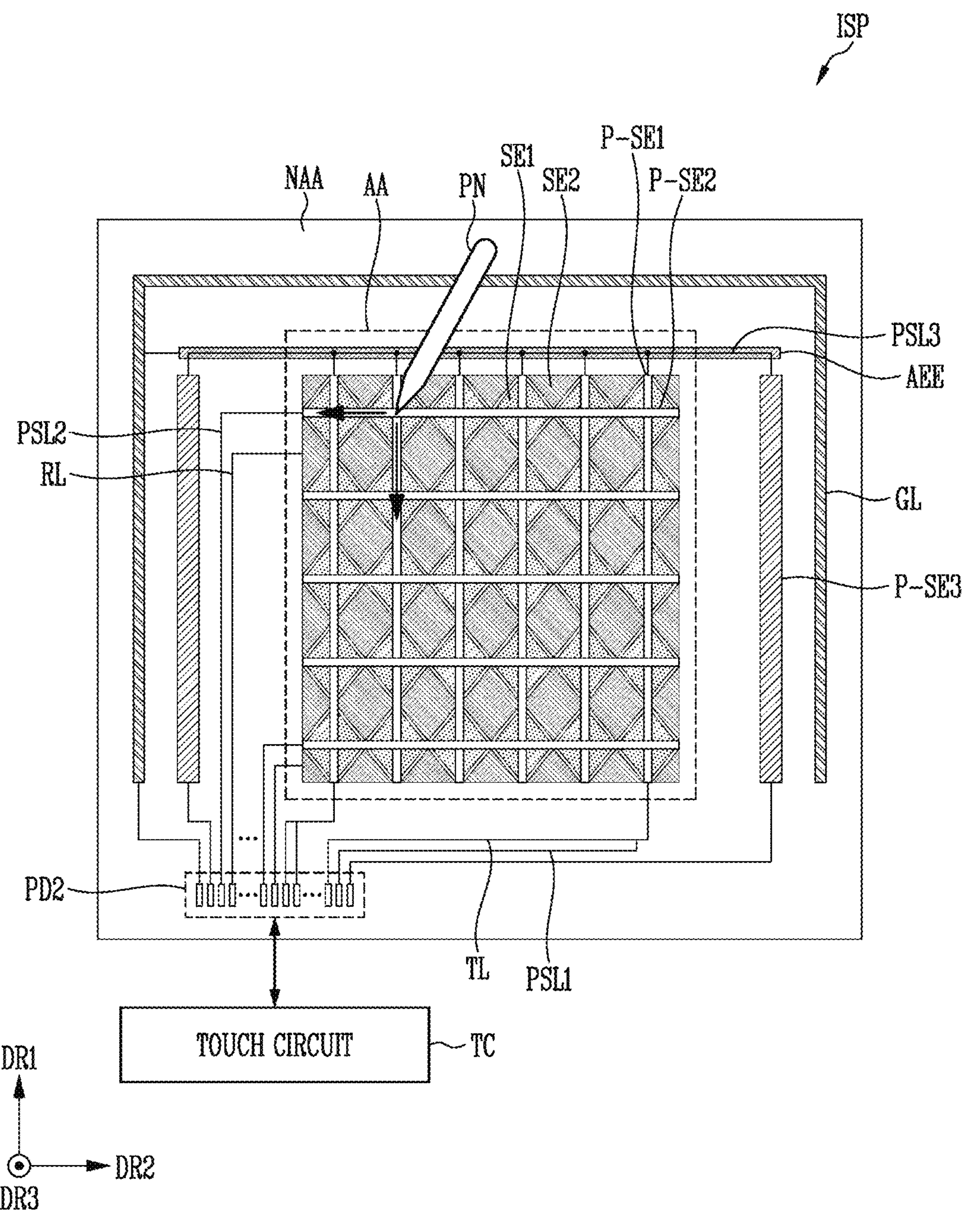
FIG. 19 is a diagram for describing a sensing operation for a first input of an input device.

FIG. 19 is a diagram for describing a sensing operation for a first input of an input device.

Referring to FIG. 19, during the pen sensing period following the charging period, the touch circuit TC may be connected to the sensing electrodes SE1 and SE2. During the pen sensing period, the driving current may not be applied to the pen sensing electrodes P-SE1 and P-SE2 and the pen sensing electrode P-SE3 disposed adjacent thereto.

The resonance circuit (see PN100 of FIG. 15) of the input device PN may generate a magnetic flux while consuming the stored charges. An induced current may be generated in the first pen sensing electrode P-SE1 and the second pen sensing electrode P-SE2 by the magnetic flux.

A first induced current generated from the first pen sensing electrode P-SE1 may be provided to the first sensing electrode SE1 by the capacitor formed by the first sensing electrode SE1 and the first pen sensing electrode P-SE1, and may be provided to the touch circuit TC. A second induced current generated from the second pen sensing electrode P-SE2 may be provided to the second sensing electrode SE2 by the capacitor formed by the second sensing electrode SE2 and the second pen sensing electrode P-SE2, and may be provided to the touch circuit TC.

The touch circuit TC may sense the position of the input device PN by sensing the induced current provided through the sensing electrodes SE1 and SE2. That is, the first input of the input device PN may be sensed by the pen sensing electrodes P-SE1 and P-SE2 and the sensing electrodes SE1 and SE2.

Figure 20:
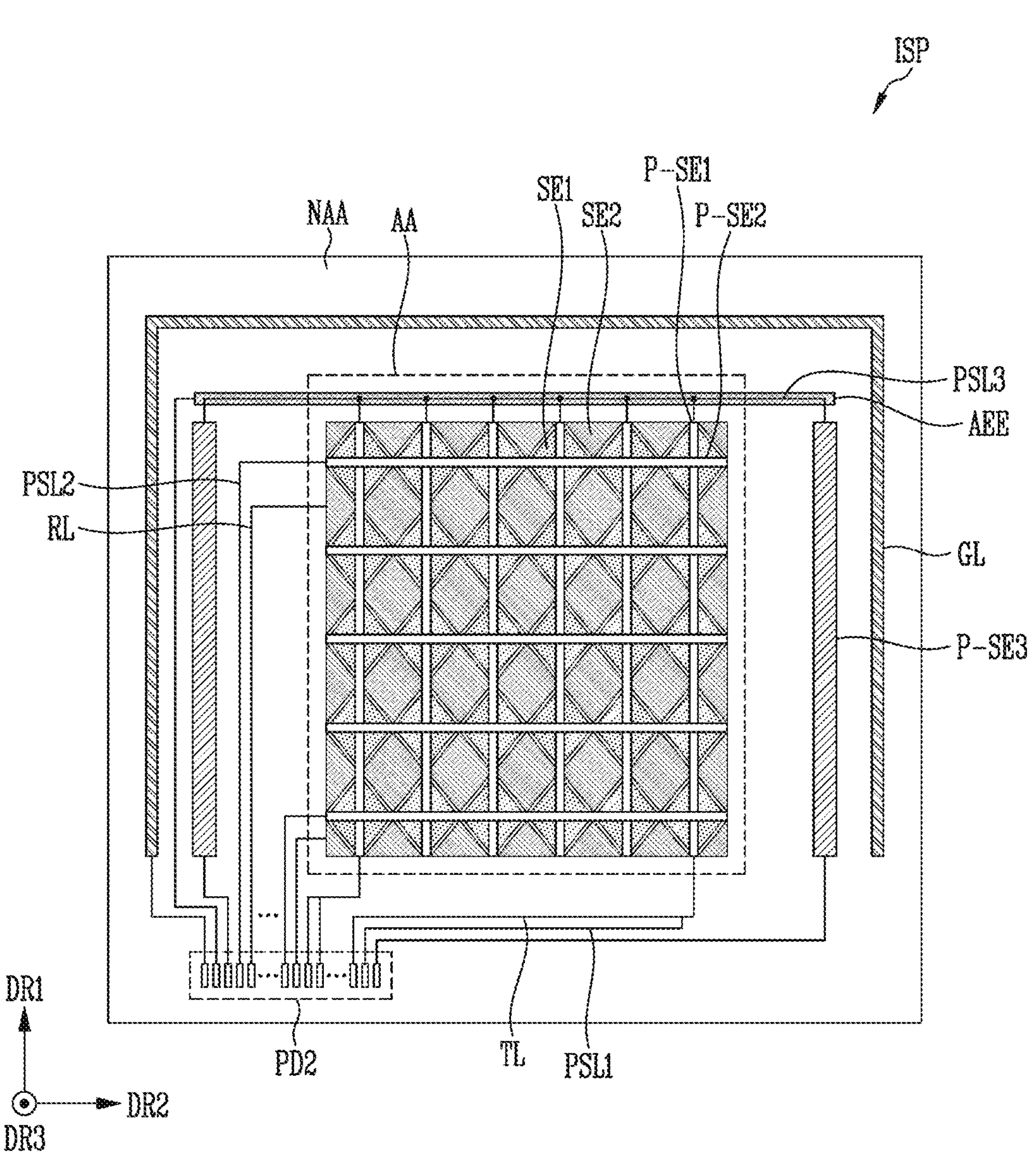
FIG. 20 is a plan view of an input sensing part in accordance with embodiments of the present disclosure.

FIG. 20 is a plan view of an input sensing part in accordance with embodiments of the present disclosure.

An input sensing part ISP according to the present embodiment is substantially the same as the input sensing part ISP of FIG. 8, except for a connection relationship of an additional electrode AEE, and therefore, a redundant description thereof is omitted and the same reference numerals are used.

Referring to FIG. 20, a reference voltage may be applied to the additional electrode AEE. The additional electrode AEE may be connected to a pad to which the reference voltage is applied among the second pads PD2.

A display device in accordance with embodiments of the present disclosure includes an additional electrode, thereby compensating for the degree of reduction in the signal output from the touch circuit and/or the signal transmitted to the touch circuit as the distance from the touch circuit increases. Accordingly, the sensing reliability of the input sensing part may be improved.

However, the effects of the present disclosure are not limited to the above-described effects and may be variously expanded without departing from the spirit and scope of the present disclosure.

While particular embodiments and application examples have been described herein, this is provided only for helping the comprehensive understanding of the present disclosure. The present disclosure is not limited to the above-described embodiments and it will be understood by those of ordinary skill in the art that various modifications and variations may be made thereto from the description of the present disclosure. Therefore, it will be understood that the spirit of the present disclosure should not be limited to the above-described embodiments, and the claims and all equivalent modifications fall within the scope of the present disclosure.

The present disclosure may be applied to a display device and an electronic device including the same. For example, the present disclosure may be applied to digital televisions (TVs), three-dimensional (3D) TVs, mobile phones, smartphones, tablet computers, virtual reality (VR) devices, personal computers (PCs), home electronic devices, notebook computers, personal digital assistants (PDAs), portable multimedia players (PMPs), digital cameras, music players, portable game consoles, navigation devices, and the like.

Although the present disclosure has been described above with reference to embodiments, those of ordinary skill in the art will understand that various modifications and changes may be made thereto without departing from the scope of the present disclosure described in the appended claims.

What is claimed is:

1. An input sensing part comprising:

a base layer including an active area and a peripheral area disposed adjacent to the active area;

first sensing electrodes arranged in the active area and extending in a first direction;

second sensing electrodes arranged in the active area and extending in a second direction intersecting with the first direction;

first pen sensing electrodes arranged in the active area, extending in the first direction, and insulated from the first sensing electrodes;

second pen sensing electrodes arranged in the active area, extending in the second direction, and insulated from the second sensing electrodes;

a pen sensing line connected to the first pen sensing electrodes; and an additional electrode insulated from the pen sensing line and overlapping at least a portion of the pen sensing line in a plan view, wherein a reference voltage is applied to the additional electrode and the additional electrode forms a capacitor with the pen sensing line.

2. The input sensing part of claim 1, further comprising a guard line arranged in the peripheral area and at least partially surrounding the active area, wherein the additional electrode is connected to the guard line.

3. The input sensing part of claim 2, wherein a reference voltage is applied to the guard line.

4. The input sensing part of claim 1, further comprising:

a first conductive pattern formed on the base layer; and a second conductive pattern formed on the first conductive pattern, wherein the first conductive pattern forms the pen sensing line, and the second conductive pattern forms the additional electrode.

5. The input sensing part of claim 4, further comprising a first insulating layer arranged between the at least a portion of the pen sensing line and the additional electrode.

6. The input sensing part of claim 5, wherein the first insulating layer is an inorganic insulating layer.

7. The input sensing part of claim 4, wherein the first conductive pattern forms at least one of the first pen sensing electrodes and the second pen sensing electrodes.

8. The input sensing part of claim 7, wherein the second conductive pattern forms at least one of the first sensing electrodes and the second sensing electrodes.

9. The input sensing part of claim 8, further comprising an insulating layer arranged between the first pen sensing electrodes and the second pen sensing electrodes and between the first sensing electrodes and the second sensing electrodes, wherein the insulating layer is an organic insulating layer.

10. The input sensing part of claim 8, further comprising:

a first insulating layer arranged between the at least a portion of the pen sensing line and the additional electrode; and a second insulating layer arranged between the first pen sensing electrodes and the second pen sensing electrodes and between the first sensing electrodes and the second sensing electrodes, wherein a thickness of the first sensing layer including the at least a portion of the pen sensing line, the additional electrode, and the first insulating layer is less than a thickness of the second sensing layer including the first pen sensing electrodes and the second pen sensing electrodes, the first sensing electrodes and the second sensing electrodes, and the second insulating layer.

11. The input sensing part of claim 1, further comprising a pad connected to at least one of the first pen sensing electrodes, wherein the pad is disposed on one side of the active area to be spaced apart from the active area and the pen sensing line is disposed on another side which opposes the one side of the active area and connected to the first pen sensing electrodes.

12. The input sensing part of claim 1, further comprising a peripheral pen sensing electrode arranged in the peripheral area and connected to the pen sensing line.

13. The input sensing part of claim 12, further comprising:

a first conductive pattern formed on the base layer; and a second conductive pattern formed on the first conductive pattern, wherein the first conductive pattern and the second conductive pattern form the peripheral pen sensing electrode.

14. The input sensing part of claim 13, wherein the first conductive pattern forming the peripheral pen sensing electrode is electrically connected to the second conductive pattern forming the peripheral pen sensing electrode.

15. A display device comprising:

a display panel; and an input sensing part arranged on the display panel, wherein the input sensing part comprises:

a base layer including an active area and a peripheral area disposed adjacent to the active area;

first sensing electrodes arranged in the active area and extending in a first direction;

second sensing electrodes arranged in the active area and extending in a second direction intersecting with the first direction;

first pen sensing electrodes arranged in the active area, extending in the first direction, and insulated from the first sensing electrodes;

second pen sensing electrodes arranged in the active area, extending in the second direction, and insulated from the second sensing electrodes;

a pen sensing line connected to the first pen sensing electrodes; and an additional electrode insulated from the pen sensing line and overlapping at least a portion of the pen sensing line in a plan view, wherein a reference voltage is applied to the additional electrode and the additional electrode forms a capacitor with the pen sensing line.

16. The display device of claim 15, further comprising a touch circuit configured to drive the input sensing part and electrically connected to a pad of the input sensing part, wherein the pad is disposed on one side of the active area to be spaced apart from the active area and the pen sensing line is disposed on another side which opposes the one side of the active area and connected to the first pen sensing electrodes.

17. The display device of claim 15, wherein the input sensing part further comprises a guard line arranged in the peripheral area and at least partially surrounding the active area, and the additional electrode is connected to the guard line.

18. The display device of claim 15, wherein the input sensing part further comprises:

a first conductive pattern formed on the base layer;

a second conductive pattern formed on the first conductive pattern; and a first insulating layer arranged between the at least a portion of the pen sensing line and the additional electrode, wherein the pen sensing line is formed of a same layer as the first conductive pattern, the additional electrode is formed of a same layer as the second conductive pattern, and the first insulating layer is an inorganic insulating layer.

* * * * *